US010839593B2

(12) United States Patent
Freeman et al.

(10) Patent No.: US 10,839,593 B2
(45) Date of Patent: Nov. 17, 2020

(54) SYSTEM, METHOD AND SOFTWARE FOR ADDING THREE-DIMENSIONAL IMAGES TO AN INTELLIGENT VIRTUAL ASSISTANT THAT APPEAR TO PROJECT FORWARD OF OR VERTICALLY ABOVE AN ELECTRONIC DISPLAY

(71) Applicant: Maxx Media Group, LLC, Philadelphia, PA (US)

(72) Inventors: Richard S. Freeman, Philadelphia, PA (US); Scott A. Hollinger, Chesterfield, MO (US)

(73) Assignee: Maxx Media Group, LLC, Philadelphia, PA (US)

( * ) Notice: Subject to any disclaimer, the term of this patent is extended or adjusted under 35 U.S.C. 154(b) by 0 days.

(21) Appl. No.: 16/699,327

(22) Filed: Nov. 29, 2019

(65) Prior Publication Data

US 2020/0098163 A1    Mar. 26, 2020

Related U.S. Application Data

(63) Continuation-in-part of application No. 15/826,637, filed on Nov. 29, 2017, now abandoned, which is a
(Continued)

(51) Int. Cl.
*G06T 15/10* (2011.01)
*G06F 3/16* (2006.01)
(Continued)

(52) U.S. Cl.
CPC .............. *G06T 15/10* (2013.01); *G02B 30/26* (2020.01); *G02B 30/56* (2020.01); *G06F 3/167* (2013.01); *G06F 16/538* (2019.01); *G06N 3/006* (2013.01)

(58) Field of Classification Search
CPC ....... G06F 16/538; G06F 3/167; G02B 30/56; G02B 30/26; G06N 3/006
See application file for complete search history.

(56) References Cited

U.S. PATENT DOCUMENTS 3,723,904 A    3/1973  Bernier
5,790,284 A    8/1998  Taniguchi et al.
(Continued)

FOREIGN PATENT DOCUMENTS

EP    3038333    6/2016

*Primary Examiner* — Haixia Du
(74) *Attorney, Agent, or Firm* — LaMorte & Associates, P.C.

(57) ABSTRACT

A system, method and software for operating a virtual assistant system that runs on an electronic device where a virtual image represents a virtual assistant. Voice recognition software identifies spoken action commands. The electronic device generates an interface image, such as an avatar, that is displayed. The interface image appears three dimensional and contains enhanced effects that cause the interface image to appear, at least in part, to project above, or in front of, the screen surface of the electronic device. The interface image responds to the spoken commands. For certain spoken commands, a command response image is provided. The command response image is a three-dimensional image or video that contains enhanced effects. The command response image can be recalled from a database or created by recalling an image or video and processing that image or video to first be three-dimensional and then to contain enhanced vertical projection effects.

18 Claims, 24 Drawing Sheets

Related U.S. Application Data continuation-in-part of application No. 15/481,447, filed on Apr. 6, 2017, now Pat. No. 10,136,121.

(60) Provisional application No. 62/319,788, filed on Apr. 8, 2016.

(51) Int. Cl.
    *G02B 30/26*     (2020.01)
    *G06F 16/538*     (2019.01)
    *G02B 30/56*     (2020.01)
    *G06N 3/00*     (2006.01)

(56) References Cited

U.S. PATENT DOCUMENTS

| | | |
|---|---|---|
| 6,121,972 A | 9/2000 | Takahashi et al. |
| 6,614,427 B1 | 9/2003 | Aubrey |
| 6,657,998 B2 | 12/2003 | Li |
| 7,364,300 B2 | 4/2008 | Favalora et al. |
| 7,567,904 B2 | 7/2009 | Layher |
| 7,589,759 B1 | 9/2009 | Freeman et al. |
| 8,438,023 B1 | 5/2013 | Hamilton |
| 9,367,869 B2 | 6/2016 | Stark |
| 9,407,904 B2 | 8/2016 | Sandrew |
| 9,438,878 B2 | 9/2016 | Niebla |
| 2002/0120554 A1 | 8/2002 | Vega |
| 2006/0079325 A1 | 4/2006 | Trajkovic |
| 2006/0294465 A1 | 12/2006 | Ronen |
| 2008/0079660 A1 | 4/2008 | Fukushima |
| 2010/0280829 A1 | 11/2010 | Gopi |
| 2011/0063420 A1 | 3/2011 | Masuda |
| 2012/0263372 A1 | 10/2012 | Adachi |
| 2012/0293615 A1 | 11/2012 | Chen et al. |
| 2012/0314934 A1 | 12/2012 | Kudo |
| 2014/0040748 A1 | 2/2014 | Lemay |
| 2015/0040012 A1 | 2/2015 | Faaborg |
| 2015/0220244 A1 | 8/2015 | Vats et al. |
| 2016/0065939 A1 | 3/2016 | Kim |
| 2017/0089716 A1 | 3/2017 | Nguyen |

SYSTEM, METHOD AND SOFTWARE FOR ADDING THREE-DIMENSIONAL IMAGES TO AN INTELLIGENT VIRTUAL ASSISTANT THAT APPEAR TO PROJECT FORWARD OF OR VERTICALLY ABOVE AN ELECTRONIC DISPLAY

RELATED APPLICATIONS

This application is a continuation-in-part of co-pending patent application Ser. No. 15/826,637 filed Nov. 29, 2017, which is a continuation-in-part of U.S. patent application Ser. No. 15/481,447, filed Apr. 6, 2017, now U.S. Pat. No. 10,136,121, which claims benefit of Provisional Application No. 62/319,788, filed Apr. 8, 2016.

BACKGROUND OF THE INVENTION

1. Field of the Invention

In general, the present invention relates to systems, methods and software that are used to create intelligent virtual assistants. More particularly, the present invention relates to systems, methods and software that show a vertical or forward projecting three-dimensional visual representation of an intelligent virtual assistant, and vertical or forward projecting three-dimensional images related to information provided by the virtual assistant. The present invention also relates to systems that integrate three-dimensional images with virtual assistant software or with a virtual assistant base station.

2. Prior Art Description

People interact with computers for a wide variety of reasons. As computer software becomes more sophisticated and processors become more powerful, computers are being integrated into many parts of everyday life. In the past, people had to sit at a computer keyboard or engage a touch screen to interact with a computer. In today's environment, many people interact with computers merely by talking to the computer. Various companies have programmed intelligent virtual assistants. For example, Apple Inc. has developed Siri® to enable people to verbally interact with their iPhones®. Amazon Inc. has developed Alexa® to enable people to search the World Wide Web and order products through Amazon®. Such prior art systems also allow the user to get helpful information about a wide variety of topics.

Although interacting with a computer via an intelligent virtual assistant is far more dynamic than a keypad or touch pad, it still has many drawbacks. Most intelligent virtual assistants are audio-only interfaces. That is, the intelligent virtual assistant receives commands audibly and presents answers audible. This audio-only communication is fine for simple requests, such as "What time is it?" However, such an audio-only interface is incapable of providing visual information in its responses. Accordingly, using an intelligent virtual assistant would be a very poor choice for answering a question, such as "What does the Eifel tower look like?"

Additionally, audio-only communications are not able to provide a human figure, which would be capable of a much more personalized level of interaction and communication through a wide range of facial expressions and body movements. Such facial expressions and body movements carry a great deal of additional, nuanced meaning beyond the mere spoken word, creating a more advanced level of interaction between human user and virtual assistant.

When interacting with an intelligent virtual assistant, audio answers typically come in the form of a disembodied voice. Attempts have been made to improve the friendliness of intelligent virtual assistants by presenting a visual virtual avatar to accompany the audio. For instance, in U.S. Patent Application Publication No. 2006/0294465 to Ronene, an avatar system is provided for a smart phone. The avatar system provides a face that changes expression in the context of an audio conversation. The avatar can be customized and personalized by a user. A similar system is found in U.S. Patent Application Publication No. 2006/0079325 to Trajkovic, which shows an avatar system for smart phones. The avatar can be customized, where aspects of the avatar are selected from a database.

In U.S. Pat. No. 9,367,869 to Stark, entitled "System And Method For Virtual Display", a system is disclosed that provides a humanoid avatar to supplement the intelligent virtual assistant being run by a smart phone. An obvious limitation with such prior art systems is that the avatar being viewed is two-dimensional. Furthermore, if a smart phone is being used, the image being viewed is on a screen that may be less than two inches wide. Accordingly, much of the visual information being communicated can be difficult to see and easy to miss.

Little can be done to change the screen size on many devices such as smart phones. However, many of the disadvantages of any two-dimensional avatar can be overcome or minimized by presenting an image that is three-dimensional. This is especially true if the three-dimensional effects designed into the image cause the image to appear to project out of the surface plane of the display. In this manner, the image will appear to stand vertically above, or in front of, the smart phone during a conversation.

In the prior art, there are many systems that exist for creating stereoscopic, auto-stereoscopic and light field images that appear three-dimensional. However, most prior art systems create three-dimensional images that appear to exist behind or below the surface plane of the electronic screen. That is, the three-dimensional effect would cause an image to appear to extend down from and behind the surface plane of the screen of a smart phone or tablet. The screen of the smart phone or tablet would appear as a window atop the underlying three-dimensional virtual image. With any screen, this limits the ability of the projection image to provide visual communication queues.

A need therefore exists for creating 3D images that can be used to augment an intelligent virtual assistant, wherein the 3D images appear three-dimensional and also appear to extend vertically above or in front of the surface plane of the electronic display from which it is shown. This need is met by the present invention as described and claimed below.

SUMMARY OF THE INVENTION

The present invention is a system, method and software for operating a virtual assistant system, which displays a vertical or forward projecting three-dimensional virtual assistant image. The virtual assistant system is run on an electronic device. The electronic device has a processing unit for running software and an electronic display. The electronic display has a screen surface.

Voice recognition software is run on the electronic device that is capable of identifying spoken action commands. The processing unit within the electronic device also generates an interface image, such as a virtual avatar, that is displayed on the electronic display. The interface image appears three-dimensional and contains enhanced vertical projection effects that cause the interface image to appear, at least in part, to extend vertically above, or in front of, the surface plane of the screen of the electronic device. The interface image is interactive and responds to the spoken action commands identified by the voice recognition software.

For certain spoken action commands, the processing unit either replaces the interface image or supplements the interface image with a secondary command response image. The secondary command response image is a stereoscopic or auto-stereoscopic image, which can be a still photo or video that contains enhanced vertical projection effects. The enhanced vertical projection effects cause the secondary command response image to appear to extend vertically above, or in front of, the surface plane of the screen of the electronic display. The secondary command response image can be recalled from a 3D model database. Alternatively, the secondary command response image can be generated by recalling a two-dimensional image or two-dimensional video and processing that image or video to first be stereoscopic, auto-stereoscopic or a light field image and then to contain enhanced vertical projection effects. The added enhanced vertical projection effects cause the image or video to appear to extend vertically above, or in front of, the surface plane of the display screen of the electronic device.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be used to augment a variety of intelligent virtual assistants, only a few exemplary embodiments are illustrated and described. The embodiments selected are for the purposes of description and explanation only. Accordingly, the illustrated embodiments are merely exemplary and should not be considered a limitation when interpreting the scope of the appended claims.

Figure 1:
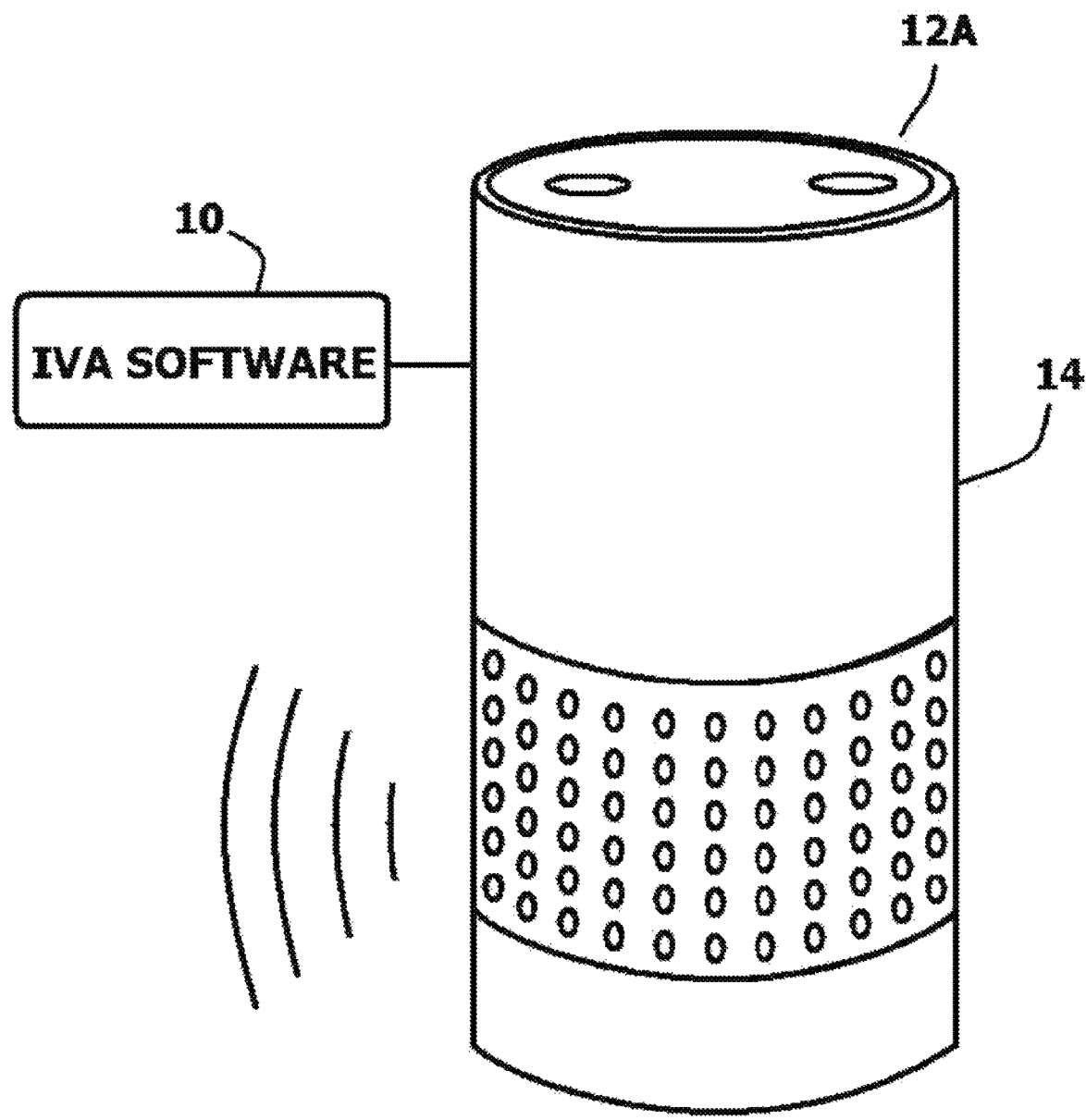
FIG. 1 is an image of a first prior art intelligent virtual assistant base station.
Figure 2:
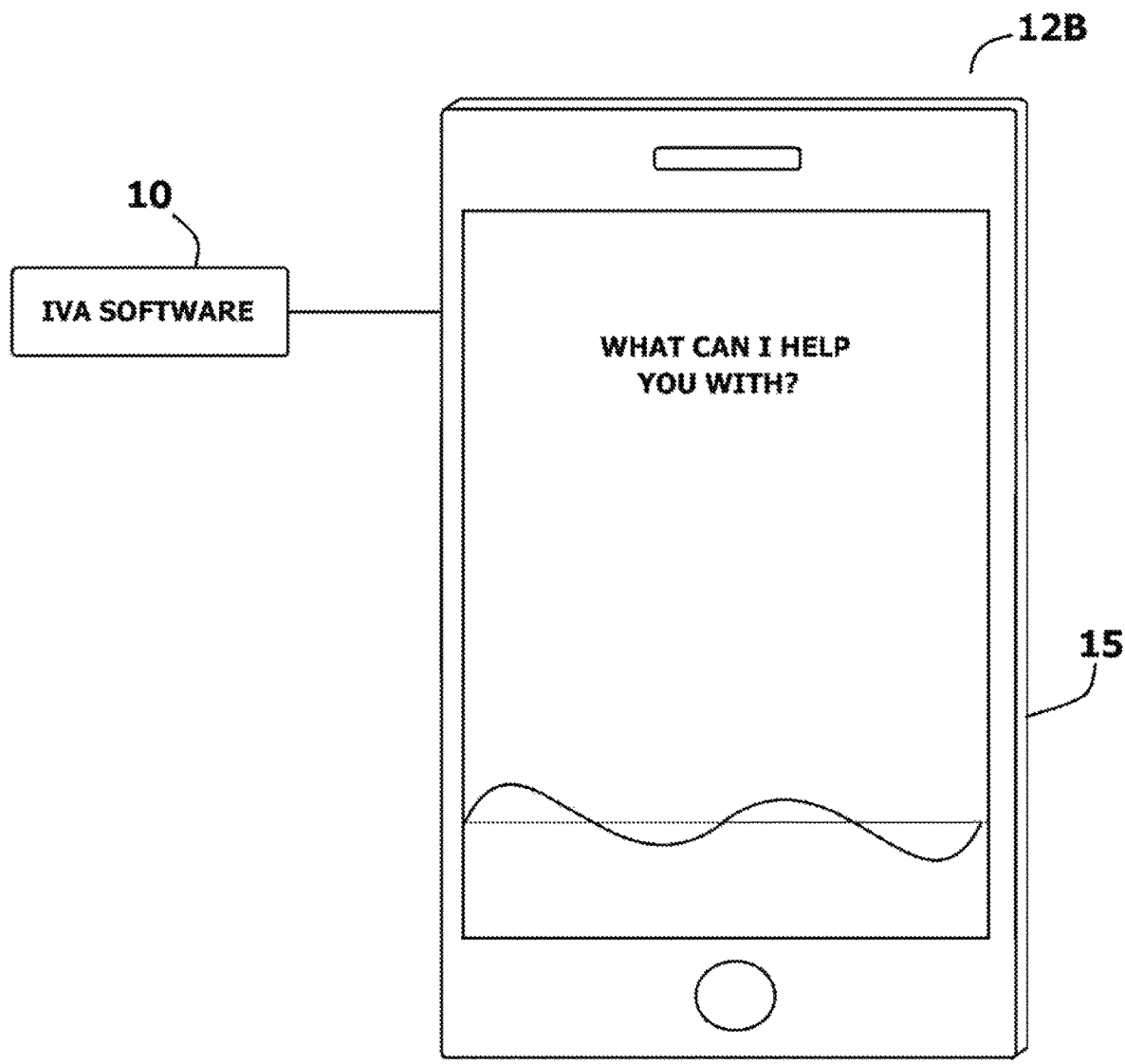
FIG. 2 is an image of a second prior art intelligent virtual assistant mobile device.

Intelligent virtual assistant (IVA) systems are systems that are run on electronic devices. Referring to FIG. 1 and FIG. 2, two common electronic devices 12A, 12B, are shown that are used to run prior art IVA software 10. In FIG. 1, the electronic device 12A is an Amazon® Echo® base station 14. The electronic device 12A is dedicated to the running of the IVA software 10 and the functioning of the overall IVA system. The electronic device 12A serves no other purpose other than to support the IVA software 10. In FIG. 2, the electronic device 12B is a mobile device, such as a smartphone 15. The IVA software 10 is integrated software, wherein the IVA software 10 is part of the operating software of the smartphone 15. Such integrated IVA software 10 is utilized in Apple® iPhones® as the SIRI® IVA system. In both dedicated IVA systems and integrated IVA systems, the IVA software 10 is audio-based. That is, the IVA system primarily interacts with a user audibly.

Figure 3:
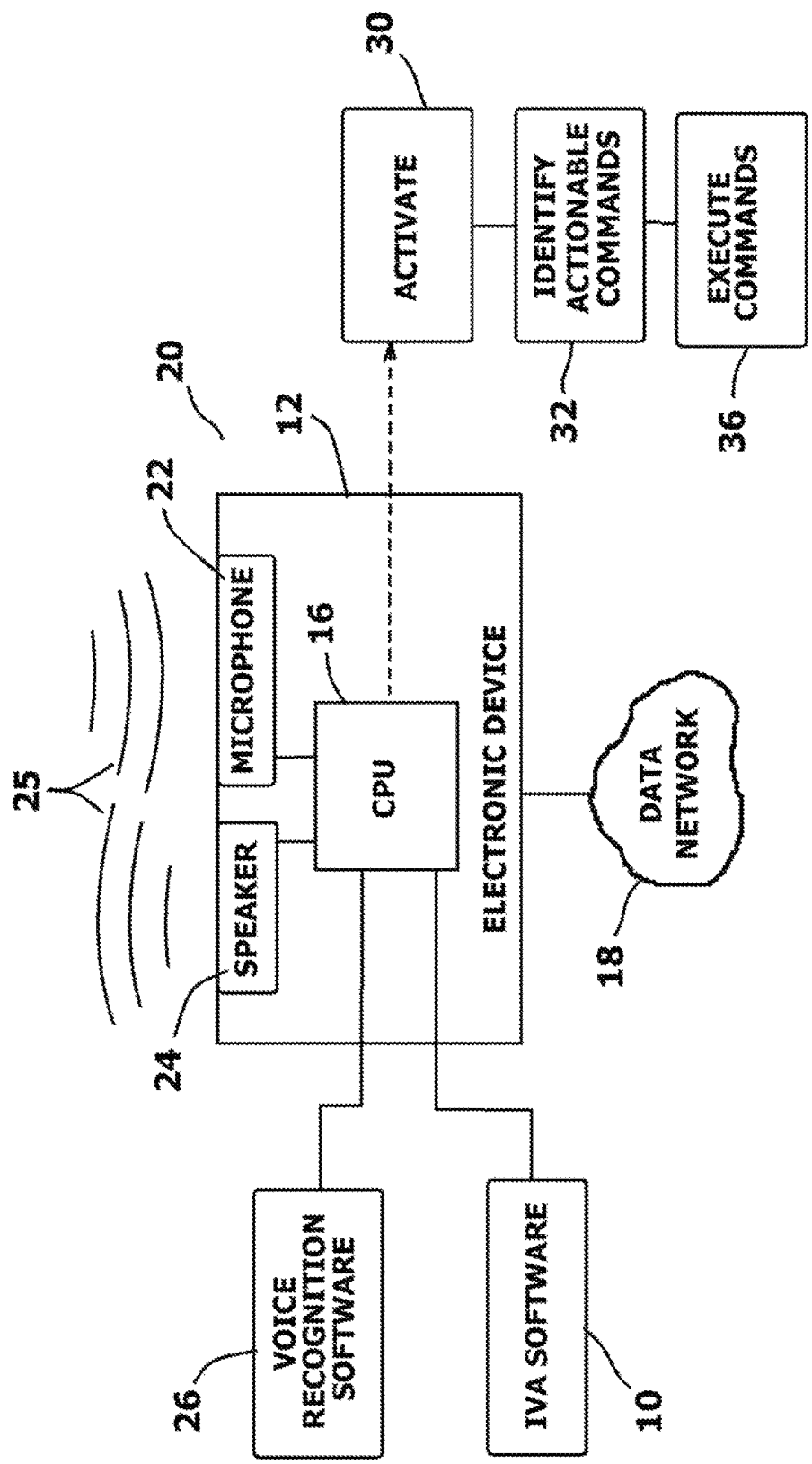
FIG. 3 is a schematic of a prior art intelligent virtual assistant system.

Referring to FIG. 3 in conjunction with FIG. 1 and FIG. 2 it can be seen that the IVA system 20 includes IVA software 10 that is run by a central processing unit 16 within the electronic device 12. The central processing unit 16 communicates with a data network 18, such as a cellular data network or the Worldwide Web. This enables the IVA software 10 to retrieve information in response to a command request. The operation of the IVA software 10 requires that the electronic device 12 have both a microphone 22 and a speaker 24 for receiving and transmitting audio signals 25. During use, a user speaks aloud to the electronic device 12. The spoken words are received by the microphone 22. The spoken words are deciphered using voice recognition software 26 that is run by the central processing unit 28 within the electronic device 12. The spoken words are analyzed for an activation word/phrase. The activation word is typically the name of the IVA system 20, such as Alexa®, Siri® or the like. Once spoken aloud, the IVA system 20 activates and IVA software 10 attempts to identify an actionable command. See Block 30 and Block 32. Different subroutines in the IVA software 10 are dedicated to different actionable commands. Once an actionable command is identified or its parameters triggered, the subroutine corresponding to that actionable command is executed. See Block 36. The actionable commands can be preprogrammed commands or commands that are triggered by words spoken by a user. Preprogrammed commands can be wake-ups alarms, appointment reminders, exercise motivational comments and the like. Actionable commands that are triggered by spoken words are more interactive.

Different IVA systems 20 have different actionable commands. However, the IVA software subroutines assigned to actionable commands tend to fall into several basic categories. Those categories include, but are not limited to, setting commands, media commands, time commands, message commands, list commands, information commands, grammar commands, shopping/purchase commands and query commands.

Setting commands control the settings of the IVA system 10. An example of a setting command would be "increase volume". If such an actionable command is perceived, a subroutine would be run by the IVA software 10 that would increase the volume to the speaker. Media commands control the selection and playing of audio-based media, such as music and audio books. An example of a media command would be "play playlist". If such an actionable command is perceived, a subroutine would be run by the IVA software 10 that would begin to audibly play the playlist of the user. Time commands are used for controlling time and date related issues, such as appointment reminders. The most common time demand is "what time is it?" If such an actionable command is perceived, a subroutine would be run by the IVA software 10 that would audibly broadcast the time. Messaging commands are used to send or receive a message, either by text or by phone. An example of a messaging command would be "call home". If such an actionable command is perceived, a subroutine would be run by the IVA software 10 that initiates a phone call to the phone number identified as "home". List commands are used to create lists, such as to-do lists and shopping lists. An example of a list command would be "add milk to the shopping list". If such an actionable command is perceived, a subroutine would be run by the IVA software 10 that would add milk to a virtual shopping list. The shopping list, when needed is audibly communicated to a user. Information commands are used to retrieve information from the day's news. An example of an information command would be "what is today's weather?" If such an actionable command is perceived, a subroutine would be run by the IVA software 10 that would audible inform the user as to the day's weather. Grammar commands are used to find proper spelling and definitions. An example of a grammar command would be "how do you spell pizzeria?" If such an actionable command is perceived, a subroutine would be run by the IVA software 10 that would audible spell "pizzeria". Shopping or purchase commands are used to review or purchase products. An example of a shopping or purchase command would be "show men's shirts" or "order item". If such an actionable command is perceived, a subroutine would be run by the IVA software 10 that would place an on-line order for an item previously identified. Lastly, query commands are used to obtain specific information about a person, place or thing. Query commands typically come in the form of "who is", "what is", or "where is" such as "what is the Eifel tower"?

In all the examples of actionable commands provided above, the communications between the IVA system 20 and the user are audio only. This is even true if the IVA system 20 is integrated into a smartphone 15 with an electronic display. Typically, the only thing displayed on the screen of a smartphone using an IVA software 10 is some simple text and graphic, such as waveform (See FIG. 2), that moves in time with the words being spoken. The graphics communicates no useful information to the user other than showing that the spoken command has been received by the integrated IVA system 20.

The improved IVA system of the present invention is both audio and visual in nature. The improved IVA system requires the use of an electronic display. If the improved IVA system is integrated with a smartphone, an electronic display is already available. However, if a dedicated IVA system, such as the Amazon® Echo® system is being used, an electronic display has to be provided or a new dedicated IVA system provided that includes a screen. This later configuration is shown in FIG. 4.

Figure 4:
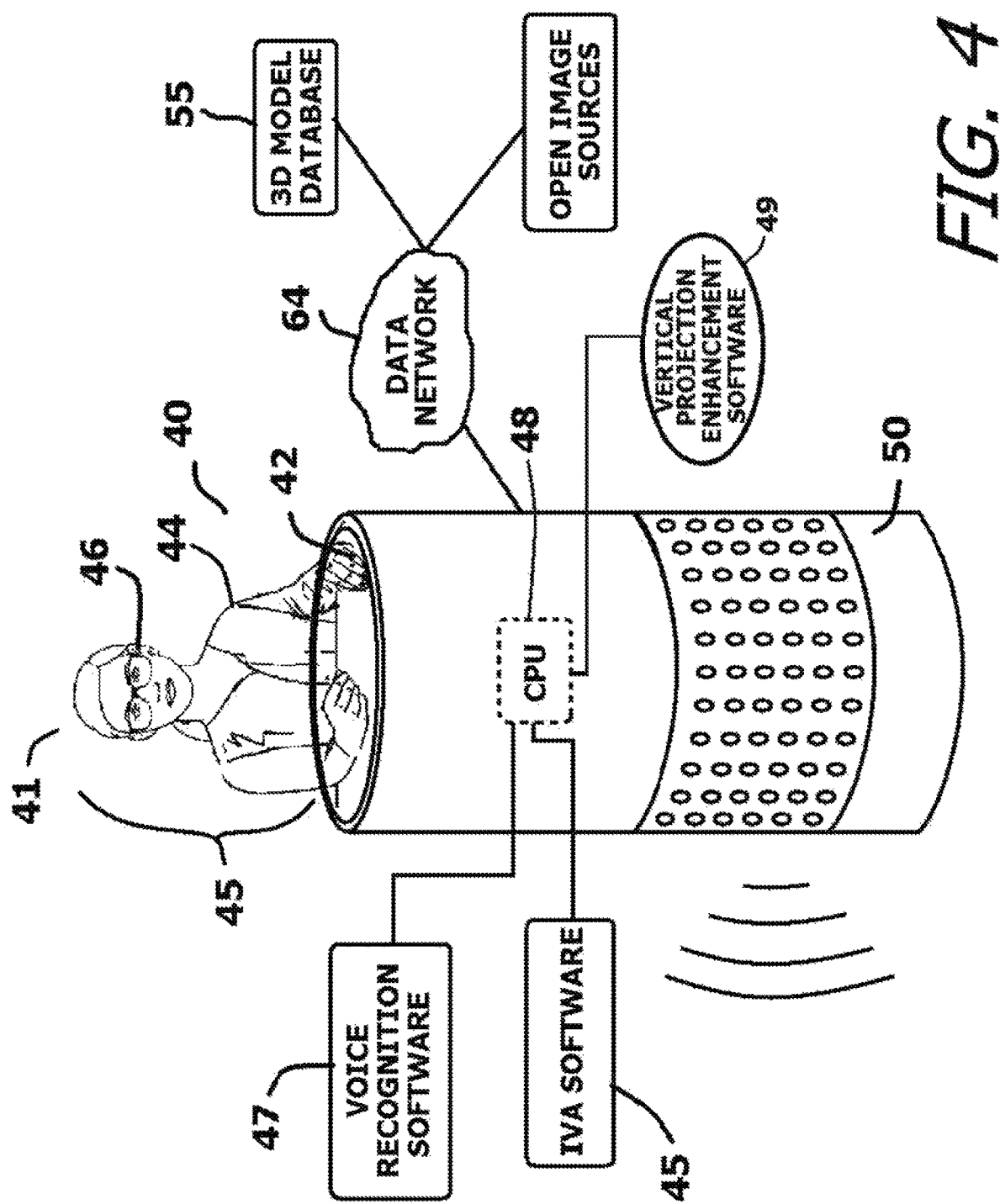
FIG. 4 is an exemplary schematic of the present invention intelligent virtual assistant system.

Referring to FIG. 4, an IVA system 40 is shown. The IVA system 40 is an electronic device 50 that has a central processing unit 48 and an electronic display 42. The central processing unit 48 runs IVA software 45 and controls the electronic display 42. The electronic display 42 shows virtual images 44 in 3D, as will be explained. The virtual images 44 are enhanced by vertical projection enhancement software 49 that modifies the virtual images 44 so they appear to extend vertically above, or in front of, the screen surface 43 of the electronic display 42 when viewed. That is, there is an area 45 above, or in front of, the electronic display 42 in which the virtual images 44 appear in 3D. Accordingly, the virtual images 44 appear to extend out of the electronic display 42, beyond the screen surface 43, when viewed. In order for the vertical projection effects of the virtual images 44 to be perceived by the viewer without the use of specialized 3D glasses, the electronic display 42 must be some form of an auto-stereoscopic display. If the electronic display 42 is not auto-stereoscopic, then 3D glasses must be utilized to perceive the enhanced vertical projection effects.

In FIG. 4, the virtual image 44 being displayed is the interface image 41 of the IVA system 40. The interface image 41 can be a CGI avatar or an image of a real person that is provided through pre-recorded or live streaming video. The interface image 41 of an avatar or real person image may be preselected by the manufacturer of the IVA system 30. However, in the use of an avatar, which may be in the likeness of a human, animal, robot or any other object, it is preferred that a 3D model for the avatar 46 be personally created by the user. In this manner, each user can customize the avatar 46 presented by the IVA system 40 to his/her own preferences. The methodology used to customize a 3D model of an avatar is disclosed in co-pending U.S. patent application Ser. No. 15/482,699, entitled "System, Method And Software For Producing Virtual Three Dimensional Avatars That Actively Respond To Audio Signals While Appearing To Project Forward Of Or Above An Electronic Display", the disclosure of which is herein incorporated by reference.

Likewise, in the use of a real person as the interface image 41, it is possible that many different real person images may be available to be selected by the user. In this manner, each user can select the real person image presented by the IVA system 40 to best suit his/her own preferences. The methodology used to produce a real person image is disclosed in U.S. Pat. No. 10,230,939, entitled, "System, Method And Software For Producing Live Video Containing Three-Dimensional Images That Appear To Project Forward Of Or Vertically Above A Display", the disclosure of which is herein incorporated by reference.

Figure 5:
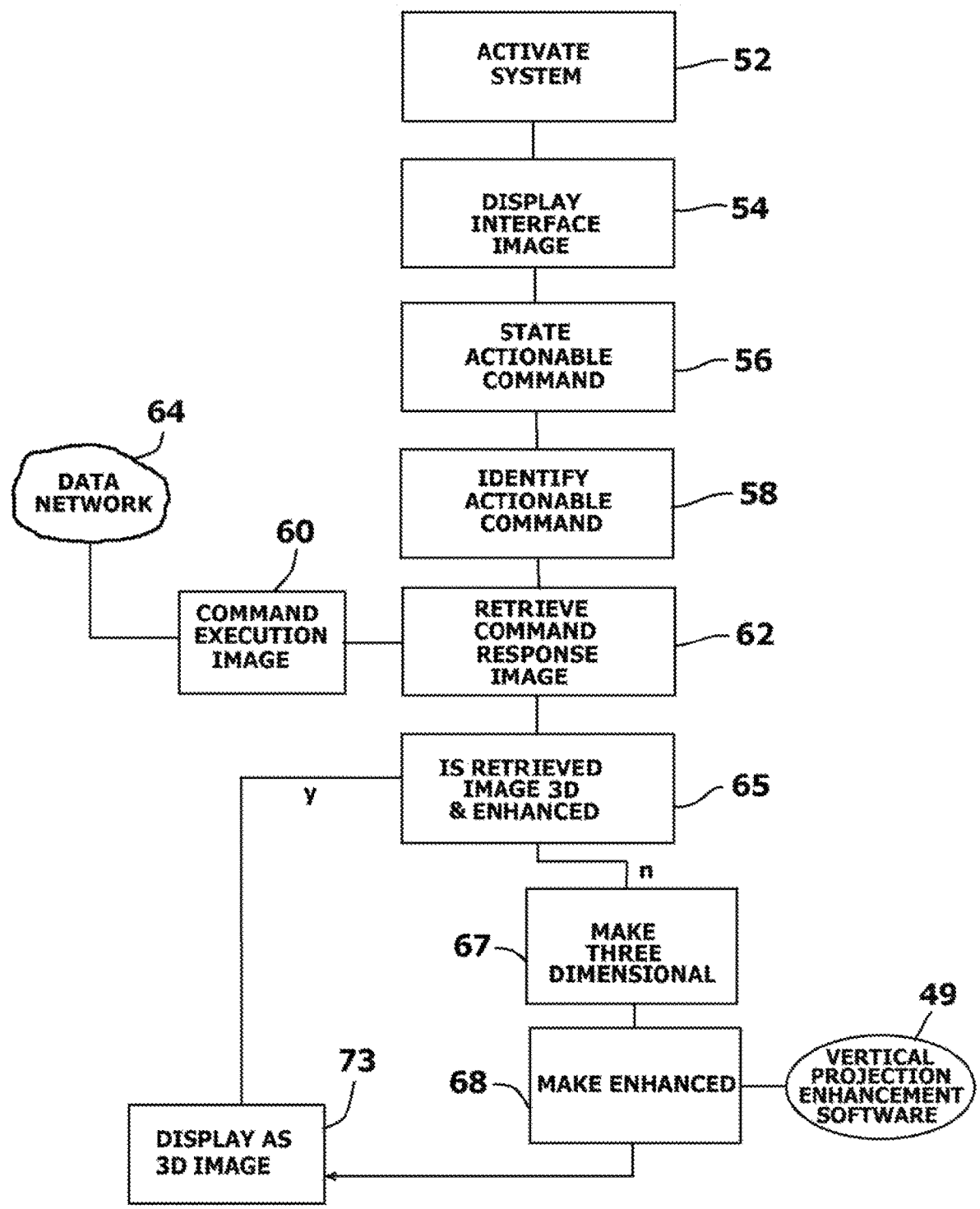
FIG. 5 is a block diagram showing the method of operation of the present invention intelligent virtual assistant system.

Referring to FIG. 5 in conjunction with FIG. 4, it will be understood that to operate the improved IVA system 40, a user first activates the IVA system 40. See Block 52. This can be done in various ways, such as powering up the IVA system 40 or simply stating an activation command, such as the name of the IVA system 40. Once activated, the 3D model of the interface image 41 appears at the electronic display 42. See Block 54. The appearance of the interface image 41 at the electronic display 42 informs the user that the IVA system 40 is ready for an actionable command. The user then verbally states an actionable command, which is captured by the voice recognition software 47 being run by the central processing unit 48 within the electronic device 50. See Block 56. The IVA system 40 uses voice recognition subroutines to identify the stated command. See Block 58.

Once a stated command is identified by the IVA system 40, the interface image 41 is replaced in whole or in part with a secondary command response image 60. See Block 62. The secondary command response image 60 presented depends upon which type of action command was voiced. The secondary command response image 60 can be either generated by the IVA system 40 or retrieved through a data network 64. In each instance, the secondary command response image 60 is enhanced by the vertical projection enhancement software 49, therein producing an enhanced three-dimensional image or three-dimensional video that appears to extend vertically above, or in front of, the electronic display 42.

The interface image 41 is a virtual model generated by software within the electronic device 50. If shown without enhancements, the interface image 41 would appear flat on the electronic display 42. Likewise, the secondary command response image 60 is either a preprogrammed virtual model that is programmed into the IVA system 50, or an image retrieved by the electronic device through its data network 18. If the image retrieved is a 2D image, the IVA system 50 converts it to a virtual 3D model using commercial 2D-to-3D conversion software. Examples of such prior art systems are shown in U.S. Pat. No. 9,407,904 to Sandrew, entitled "Method For Creating 3D Virtual Reality From 2D Images" and U.S. Patent Application Publication No. 2016/0065939 to Kim, entitled "Apparatus, Method, And Medium Of Converting 2D Image To 3D Image Based On Visual Attention". Likewise, there are several prior art systems for converting a two-dimensional video into a three-dimensional video. Such prior art techniques are exemplified by U.S. Pat. No. 9,438,878 to Niebla, entitled "Method Of Converting 2D Video To 3D Video Using 3D Object Models".

Figure 6:
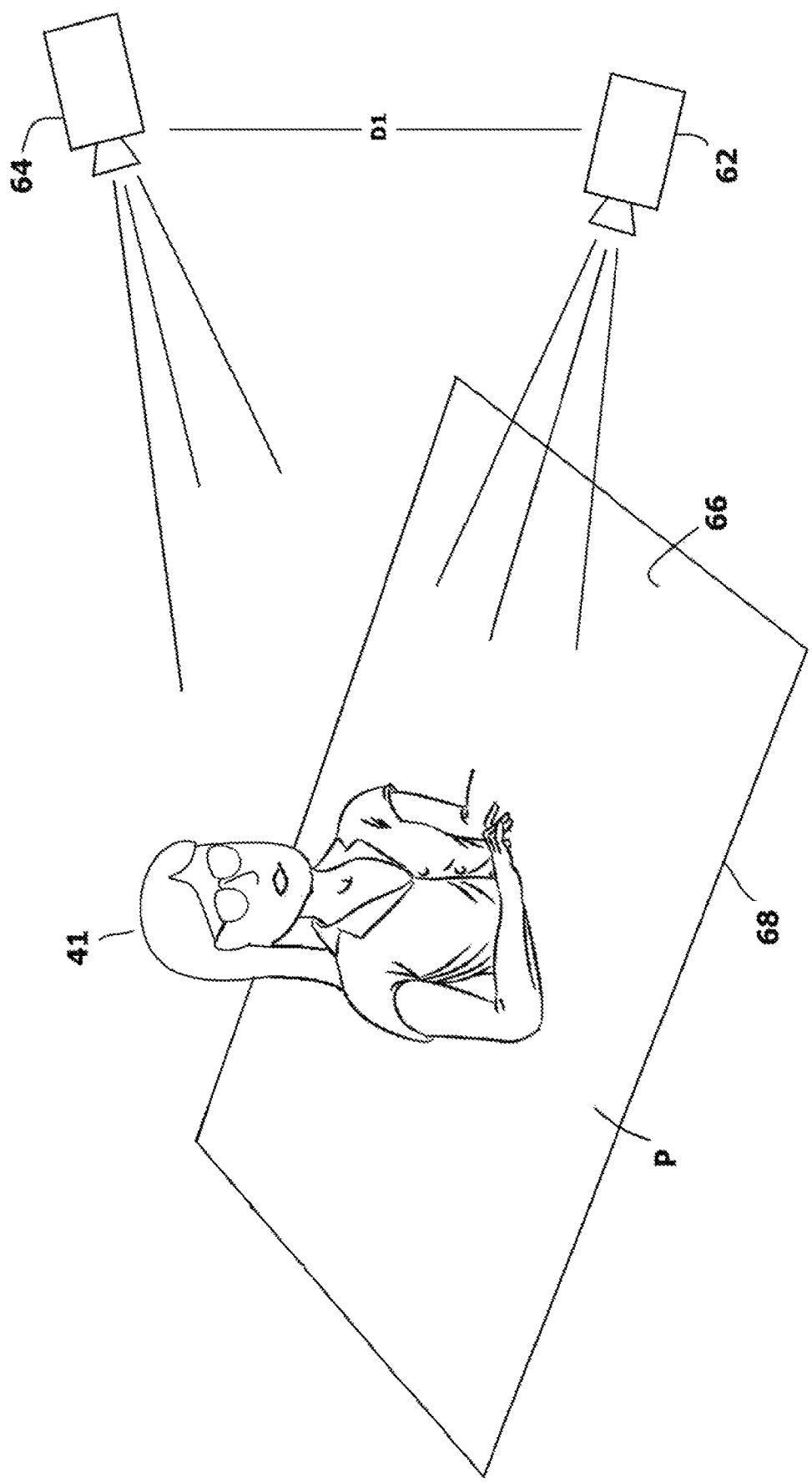
FIG. 6 is a perspective view of an exemplary embodiment of a virtual reference plane where the interface image is imaged for enhancement.

The interface image 41 and/or the secondary command response image 60 is enhanced by the vertical projection enhancement software 49 in order to make that image appear to exist in the area 45 above, or in front of, the electronic display 42. Referring to FIG. 6 in conjunction with FIG. 4 and FIG. 5, the operational steps of the vertical projection enhancement software 49 are initially explained. The IVA system 50 virtually images the virtual model of the interface image 41 and/or the secondary command response image. In FIG. 6, only the interface image 41 is shown for the purposes of explanation. However, it will be understood that the methodology being explained is also used to enhance the command response image 60, which is not shown in the example.

The model of the interface image 41 is imaged from two stereoscopic virtual camera viewpoints 62, 64 that are positioned at equal heights above a selected virtual reference plane 66. This produces two stereoscopic images of the interface image 41 for a given point of time. The virtual camera viewpoints 62, 64 are preferably oriented with a virtual zero parallax focused on the reference plane 66. The stereoscopic images can be repeated and updated on a frame-by-frame basis as the model of the interface image 41 updates.

The interface image 41 has a reference plane 66 that is aligned with the plane of display where it will be viewed. As such, when the interface image 41 is enhanced and viewed, any portion of the interface image 41 imaged above the reference plane 66 is intended to project forward or above the reference plane 66 so it appears to extend into the area 45 in front of, or above, the display 42. Conversely, any portion of the interface image 41 imaged below the reference plane 66 is projected rearwardly and will appear below or behind the display 42 when viewed.

To enhance the interface image 41, stereoscopic views are taken of the interface image 41 from a selected angle. The stereoscopic views are taken from the virtual left camera viewpoint 62 and the virtual right camera viewpoint 64. The distance D1 between the virtual camera viewpoints 62, 64 and the angle of elevation of the virtual camera viewpoints 62, 64 is dependent upon the selected scale and view angle. The interface image 41 is being enhanced so it can be shown on the electronic display 42. All electronic displays are defined within a peripheral boundary 68. That is, the outer edge or edges of the display. Any portion of the interface image 41 that is to be displayed on the electronic display must exist within the boundaries 68 from the viewpoint of the observer.

Since all of the matter to be imaged must appear within the selected boundaries 68 of the display 42, the interface image 41 has an overall height H1 that depends upon the dimensions of the peripheral boundaries 68. The virtual camera viewpoints 62, 64 are set to a height that is a function of the height of the interface image 41 and the rear of the peripheral boundary 68. The height of the virtual camera viewpoints 62, 64 is high enough so that the top of the interface image 41 remains within the peripheral boundary 68 for the selected angle of view that is provided to the virtual camera viewpoints 62, 64. The angle of view provided the virtual camera viewpoints 62, 64 and the convergence angle of the camera viewpoints 62, 64 have direct geometric relationships that enable use within the peripheral boundary 68 and height of the interface image 41.

The virtual camera viewpoints 62, 64 can have converging angles of view so that the virtual camera viewpoints 62, 64 intersect. That is, the two virtual camera viewpoints 62, 64 can achieve zero parallax at a convergence point P. The convergence point P is preferably selected to correspond to a point near the bottom of the interface image 41. The converging angles of view provided the virtual camera viewpoints 62, 64 are adjusted on a frame-by-frame basis should the selected viewpoint change or should the interface image 41 move relative the reference plane 66.

The provisional targeting model 40 is not merely imaged from the camera viewpoints 62, 64. Rather, before and/or after the imaging of the interface image 41, the interface image 41 is digitally manipulated in various manners to create enhanced vertical projection effects. The digital manipulations performed by the vertical projection enhancement software 49 include, but are not limited to:

i. tilt manipulations of the reference plane 66;
ii. tilt manipulations of the interface image 41 and/or command response image 60 relative the reference plane 66;

iii. bend manipulations of the interface image 41, command response image 60 or features contained therein;

iv. taper manipulations of the interface image 41, command response image 60 or features contained therein; and v. vertical elongation of the interface image 41, command response image 60 or features contained therein.

The manipulations that are used depend upon the characteristics of the interface image 41 and/or the command response image 60.

Figure 7:
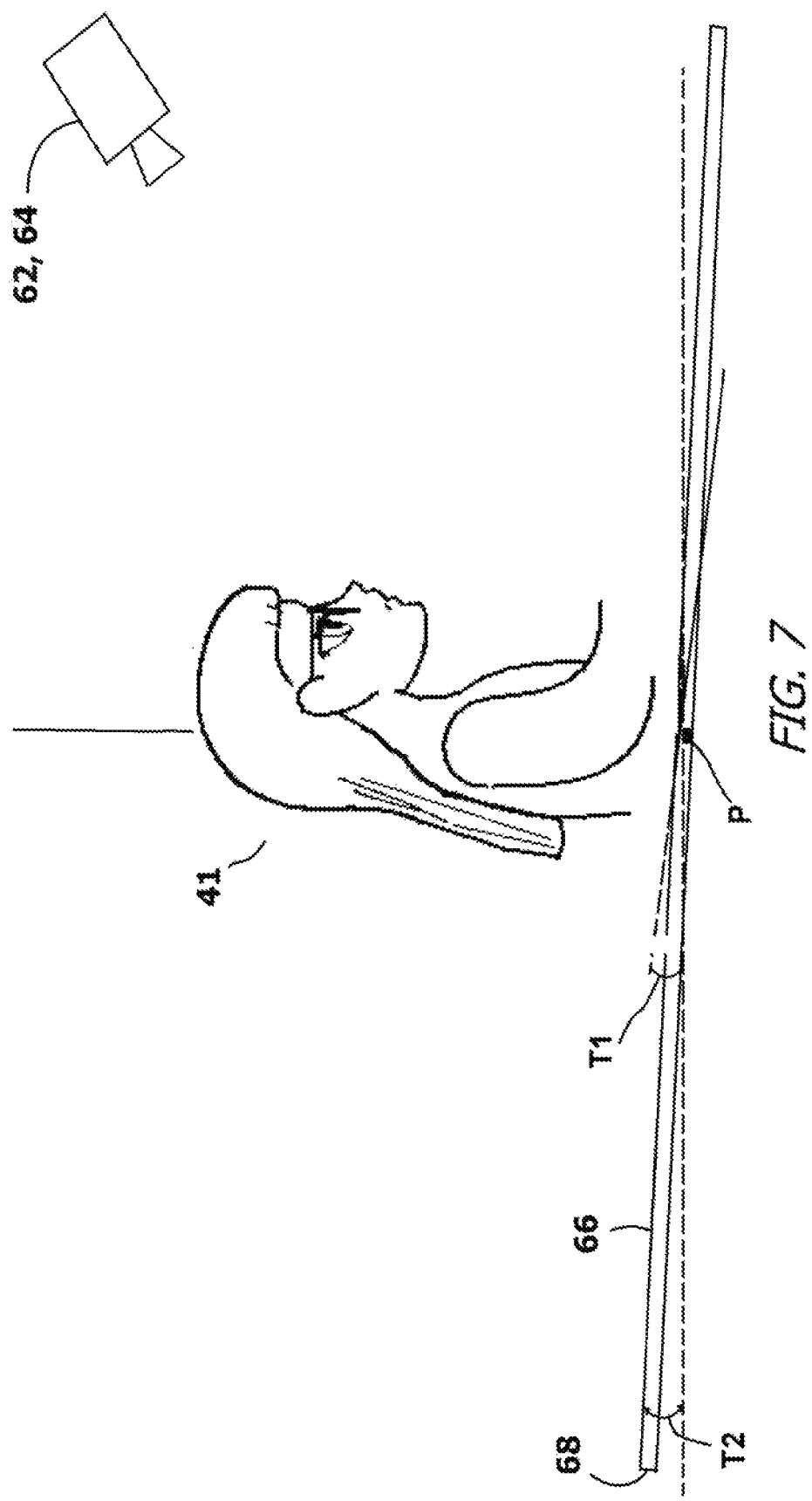
FIG. 7 is a side view showing tilt digital modifications made to the interface image of FIG. 6.

FIG. 7 illustrates two of the possible tilt manipulations that can be used. In a first tilt manipulation, the reference plane 66 can be tilted about the camera viewpoint conversion point P toward or away from the virtual camera viewpoints 62, 64. The preferred tilt angle A2 is generally between 1 degree and 20 degrees from the horizontal, depending upon the final perceived height of the interface image 41. In a second tilt manipulation, the interface image 41 itself or a selected feature from within the interface image 41 can be tilted about the camera viewpoint conversion point P toward or away from the virtual camera viewpoints 62, 64. The preferred tilt angle A1 is generally between 1 degree and 20 degrees from the horizontal, depending upon the final perceived height of the interface image 41. The tilt angle A1 of the provisional targeting model 40 is independent of the tilt angle A2 of the reference plane 66.

Using the camera viewpoint conversion point P under the interface image 41 as a fulcrum point, the reference plane 66 can be digitally manipulated to tilt forward or backward. The tilt angle T2 of the reference plane 66 is independent of the tilt angle T1 of the interface image 41. The tilting of the reference plane 66 changes the position of the peripheral boundaries 68 relative to the perceived position of the interface image 41. This enables the height of the interface image 41 to be increased proportionally within the confines of the allotted space.

Figure 8:
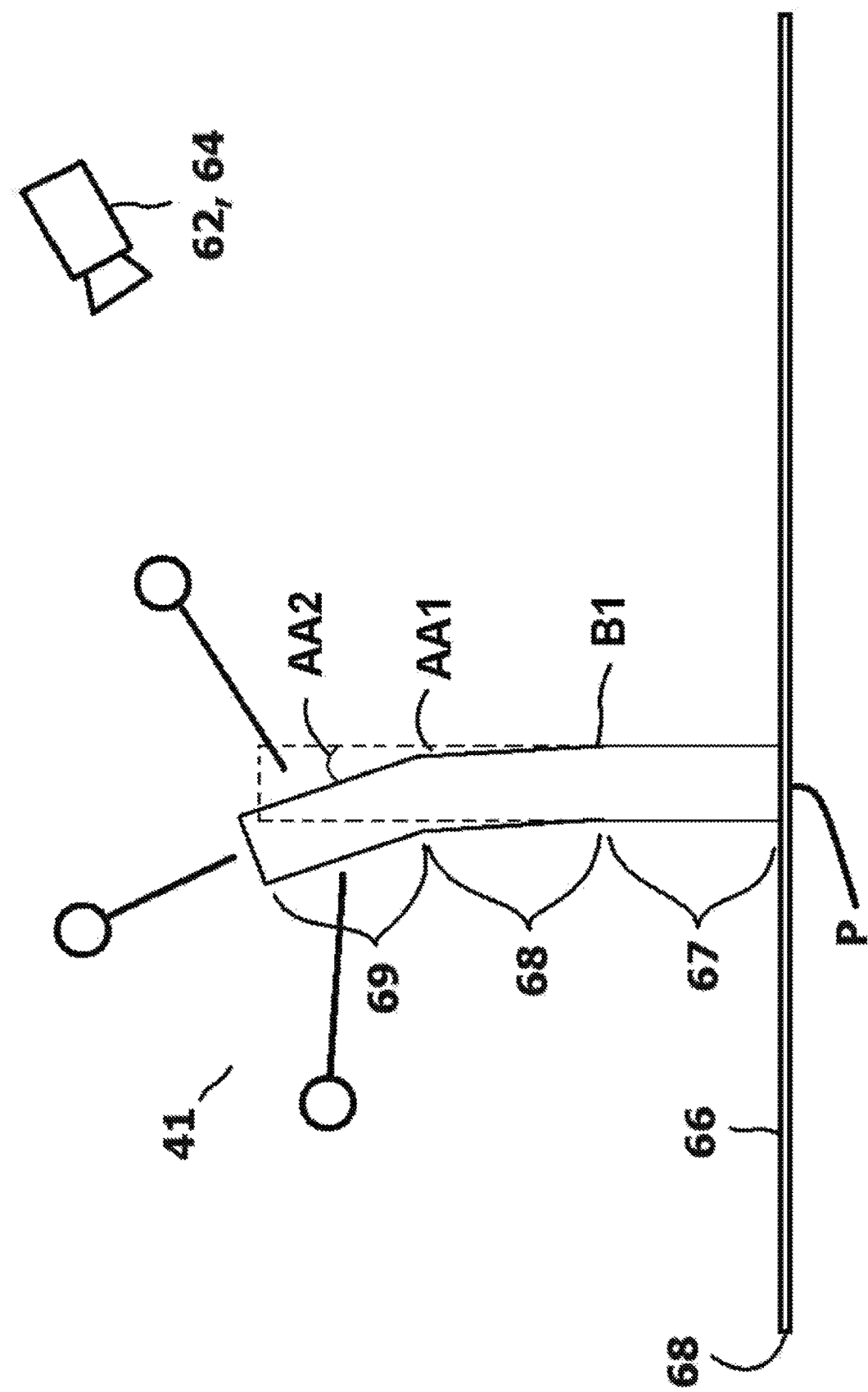
FIG. 8 is a side view showing digital bend modifications made to the interface image.

Referring to FIG. 8, a preferred bend manipulation is shown. In FIG. 8, the interface image 41 or a feature from within the interface image 41 is digitally bent away from its original vertical orientation. In FIG. 8, the interface image 41 is conceptually shown as a rectangle so that changes caused by bending can be better recognized and understood. A bend point B1 is selected along the height of the interface image 41 or a feature within the interface image 41 above the convergence point P. The bend line B1 is between ⅓ and ⅔ the overall height of the interface image 41 or feature. The interface image 41 or feature is divided into three regions 67, 69, 71 along the vertical. In the first region 67, the interface image 41 is not digitally manipulated. In the second region 69, no digital manipulation occurs until the bend line B1. Any portion of the interface image 41 or selected feature above the bend line B1 and within the second region 69 is digitally bent to a first angle AA1. In the third region 71, the interface image 41 or selected feature is tilted at a second angle AA2, which is steeper than the first angle AA1. The first angle AA1 and the second angle AA2 are measured in relation to an imaginary vertical plane that is parallel to the vertical plane in which the virtual camera viewpoints 62, 64 are set. The result is that the interface image 41 or selected feature from the interface image 41 can be made larger and taller without extending outside the peripheral boundary 68, as viewed from the virtual camera viewpoints 62, 64. As a consequence, when viewed from the virtual camera viewpoints 62, 64, the interface image 41 or selected feature from the interface image 41 appears taller and has a more pronounced forward or vertical projection.

Figure 9:
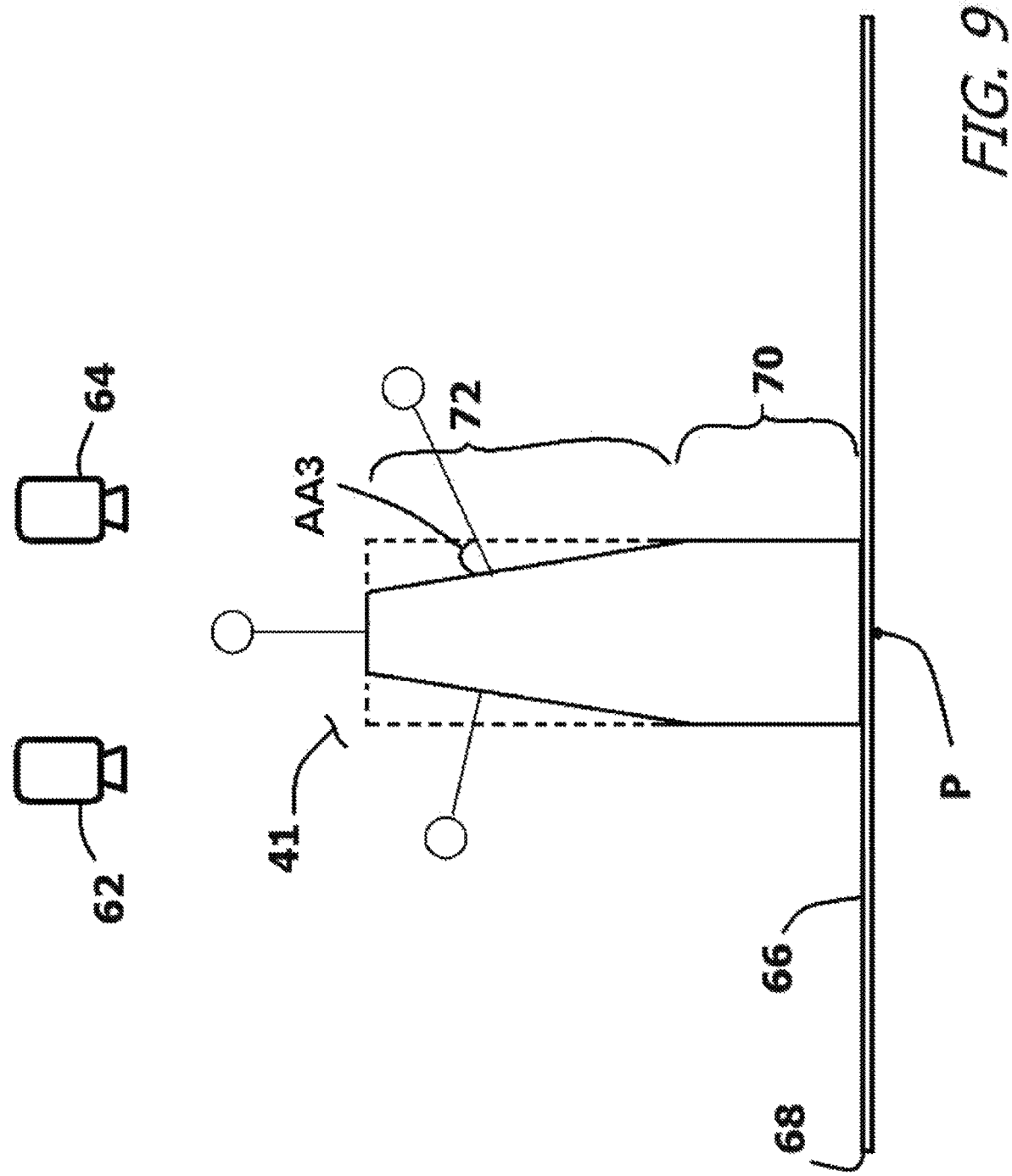
FIG. 9 is a front view showing digital taper modifications made to the interface image.

Referring to FIG. 9, a preferred taper manipulation is explained. Again, the interface image 41 is conceptually shown as a rectangle to better illustrate changes in shape caused by tapering. The interface image 41 or selected feature from the interface image 41 above the convergence point P is divided into two regions 70, 72 along its height. In the first region 70, the interface image 41 or selected feature from the interface image 41 is not digitally manipulated. In the second region 72, the interface image 41 or selected feature from the interface image 41 is reduced in size using a taper angle AA3 of between 1 degree and 25 degrees. The point where the taper begins is positioned between ⅓ and ⅔ up the height of the interface image 41 or selected feature from the interface image 41. The result is that the interface image 41 or selected features from the interface image 41 can be made wider without extending outside the peripheral boundary 68, as viewed from the virtual camera viewpoints 62, 64. As a result, the interface image 41 or selected feature from the interface image 41 has a more pronounced forward or vertical projection.

Figure 10:
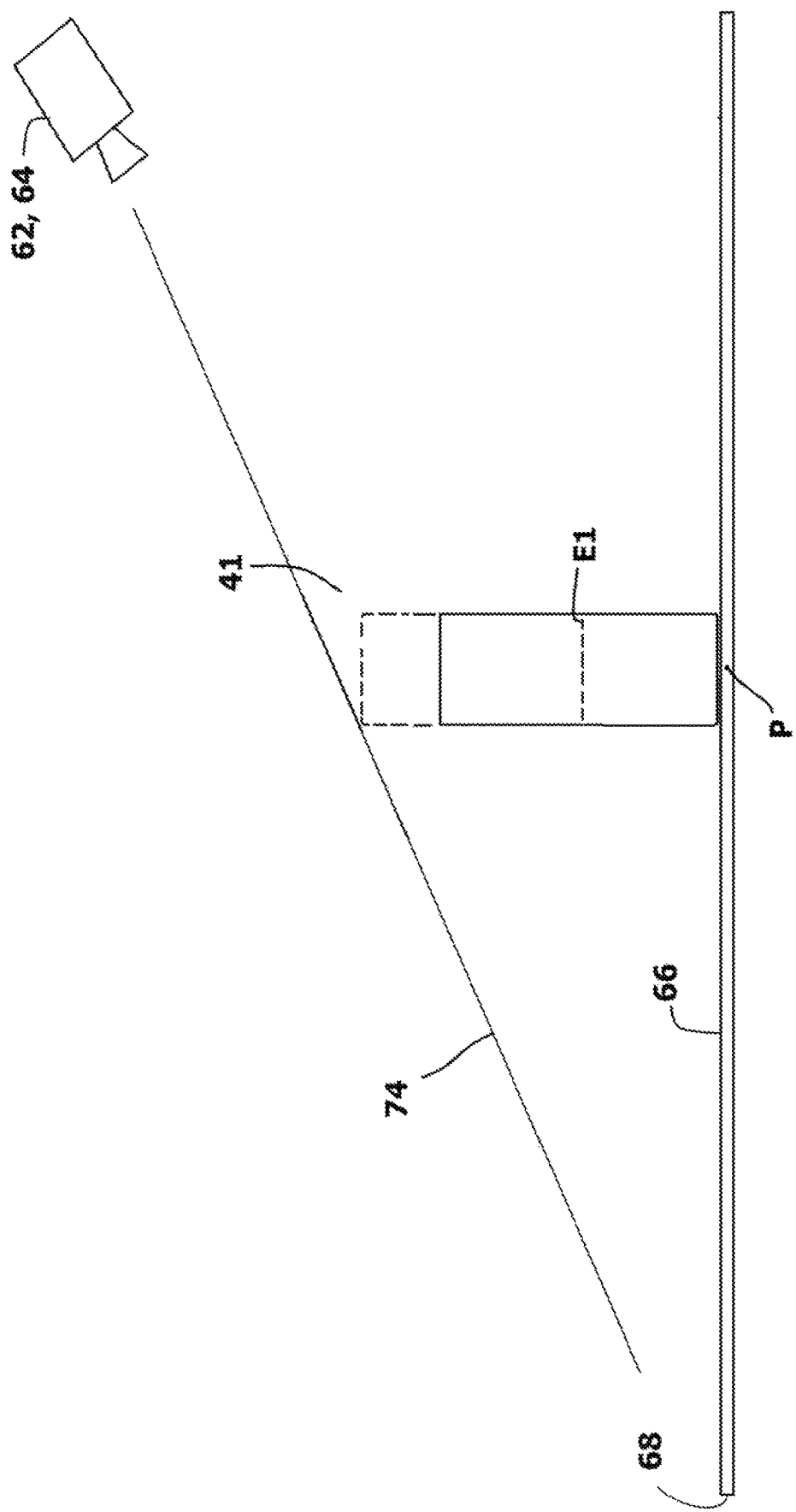
FIG. 10 is a side view showing digital elongation modifications made to the interface image.

Referring to FIG. 10, a preferred elongation manipulation is shown. Again, the interface image 41 is conceptually shown as a rectangle to better illustrate changes in shape caused by elongation. In FIG. 10, the interface image 41 or a feature from within the interface image 41 is digitally elongated above the convergence point P along its original vertical axis. An elongation point E1 is selected along the height of the interface image 41 or a feature within the interface image 41. The elongation point E1 is preferably between ⅓ and ⅔ the overall height of the interface image 41 or feature. Below the elongation point E1, no digital manipulation occurs. Any portion of the interface image 41 or selected feature above the elongation point E1 is digitally elongated. There is an imaginary plane 74 from the vertical camera viewpoints 62, 64 to the peripheral boundary 68. The interface image 41 or the feature from the interface image 41 is elongated until it approaches the imaginary plane 74. The result is that the interface image 41 or selected feature from the interface image 41 can be made taller without extending above the peripheral boundary 68, as viewed from the virtual camera viewpoints 62, 64. As a consequence, when viewed from the virtual camera viewpoints 62, 64, the interface image 41 or selected features from the interface image 41 appear taller and have a more pronounced forward or vertical projection.

Figure 11:
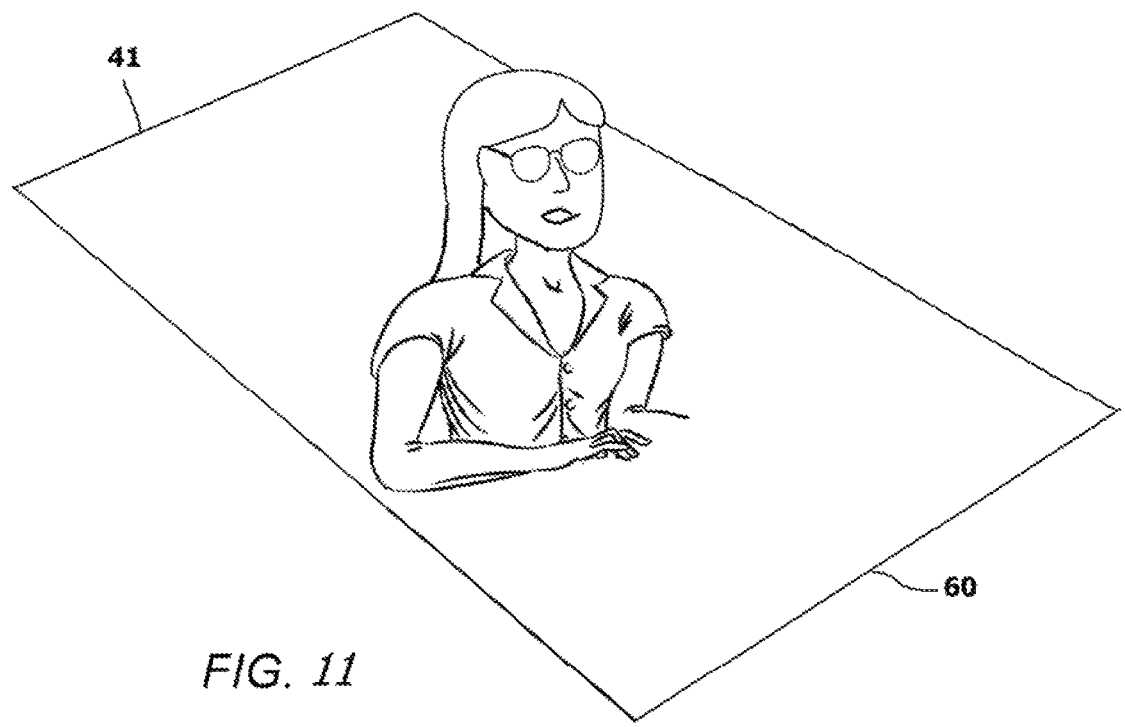
FIG. 11 and FIG. 12 show left and right stereoscopic images, respectively, of the interface image.
Figure 12:
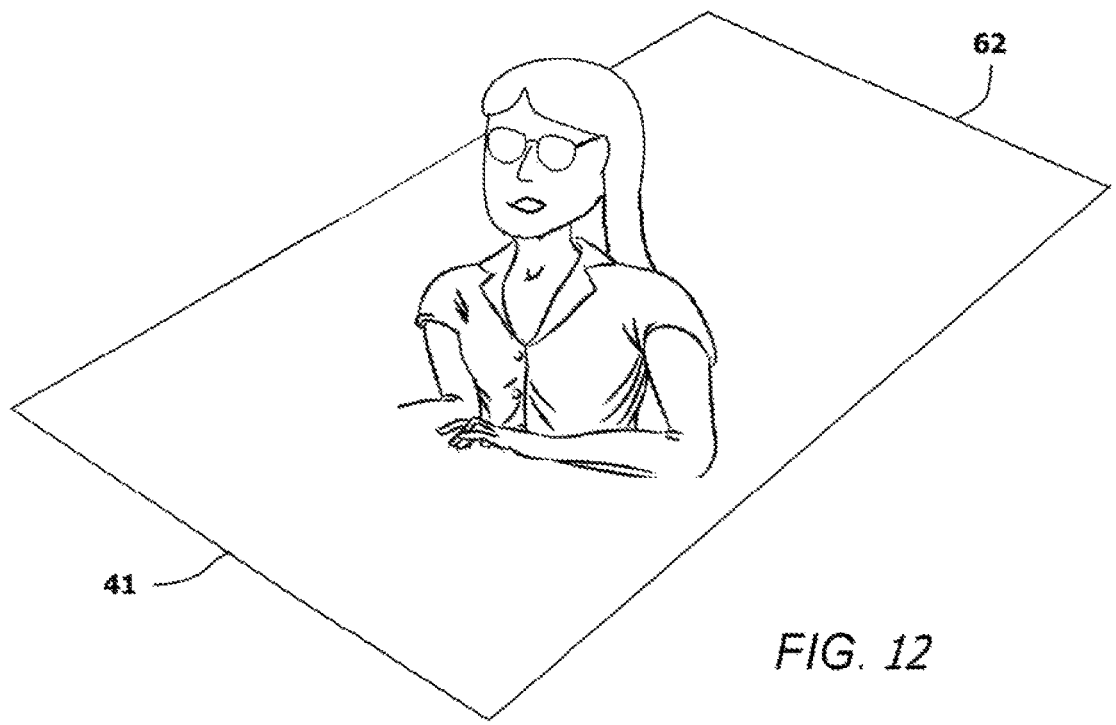

Once the interface image 41 is digitally manipulated in one or more of the manners described, the interface image 41 is imaged. Referring to FIG. 11 and FIG. 12 in conjunction with FIG. 6, it can be seen that the two images taken are stereoscopic, with one being the left camera image 80 (FIG. 11) and one being the right camera image 82 (FIG. 12). Each stereoscopic image 80, 82 has a geometrically distorted perspective due to the angle of the virtual camera viewpoints 62, 64. This causes the front of the imagery to appear to be wider than the rear of the imagery.

Figure 13:
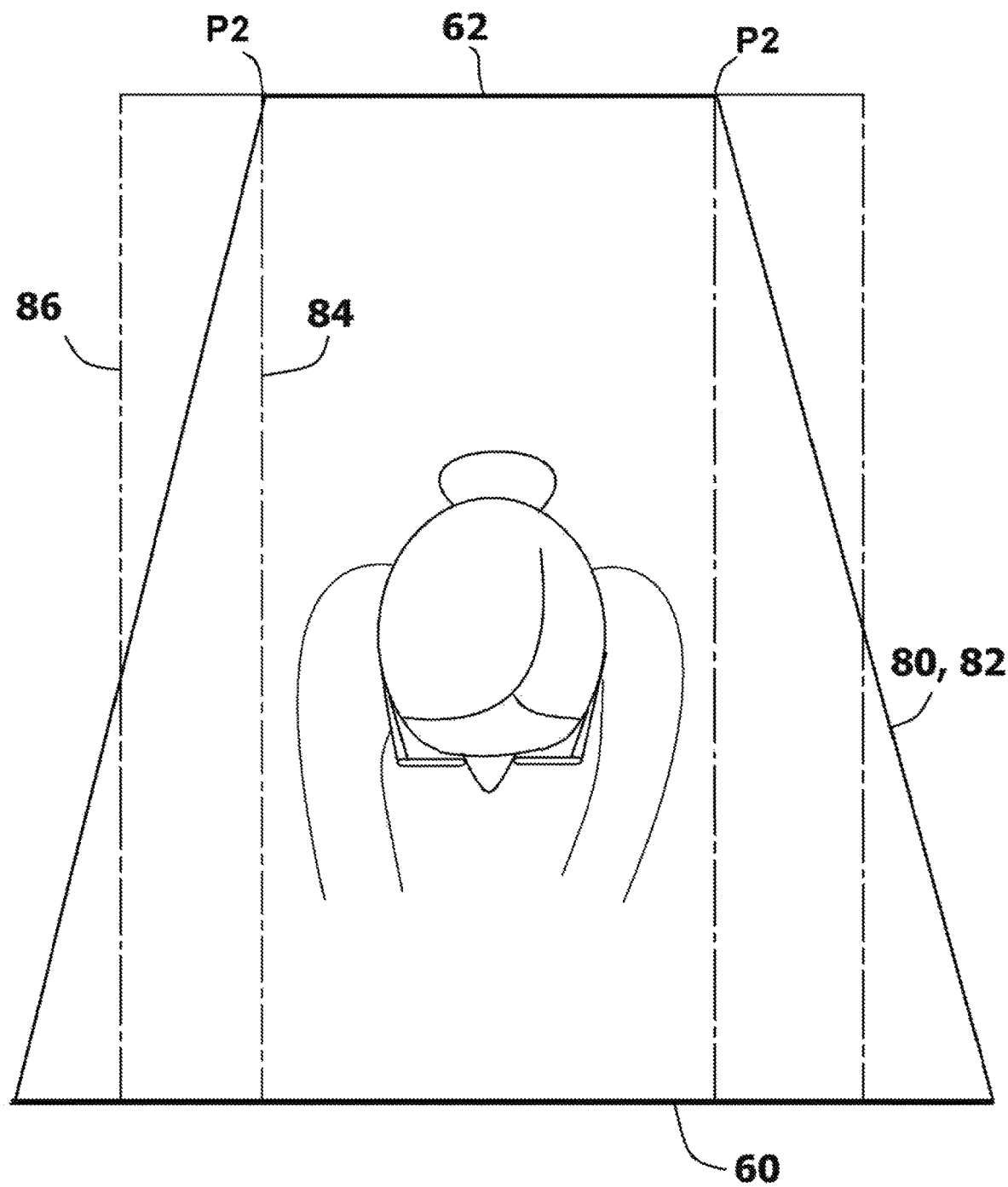
FIG. 13 is a top view of the stereoscopic images showing the superimposition of guidelines.

Referring to FIG. 13, a top view of one of the stereoscopic images 80, 82 from FIG. 10 or FIG. 11 is shown. Although only one of the stereoscopic images 80, 82 is shown, it will be understood that the described process is performed on both of the stereoscopic images. Thus, the reference numbers 80, 82 of both stereoscopic images are used to indicate that the processes affect both.

Temporary reference guides are superimposed upon the stereoscopic images 80, 82. The reference guides include a set of inner guidelines 84 and a set of outer guidelines 86. The inner guidelines 84 are parallel lines that extend between the front and rear of the image. The inner guidelines 84 begin at points P2 where the stereoscopic images 80, 82 meet the peripheral boundary 68. The outer guidelines 86 are also parallel lines that extend from opposite ends of the peripheral boundary 68. The position of the outer guidelines 86 depends upon the dimensions of the electronic display 42. The width between the outer guidelines 86 corresponds to the pixel width of the electronic display 42 to be used.

Figure 14:
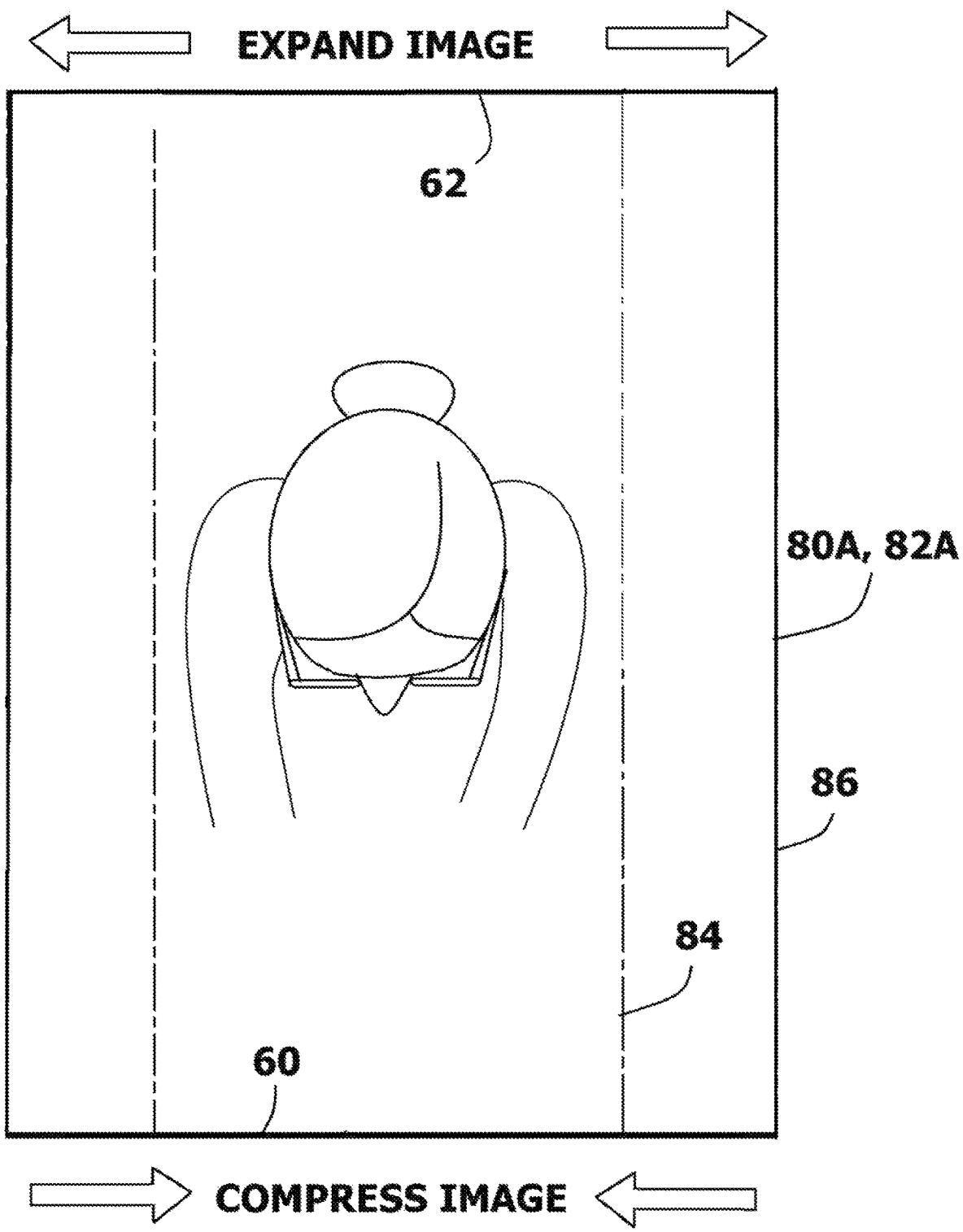
FIG. 14 shows a digitally corrected stereoscopic image created using the guidelines previously shown in FIG. 13.

Referring to FIG. 14 in conjunction with FIG. 13, it can be seen that the stereoscopic images 80, 82 are again digitally altered to fit within the parameters of the outer guidelines 86. As such, the stereoscopic images 80, 82 are widened toward the rear and compressed toward the front. This creates corrected stereoscopic images 80A, 82A. The inner guidelines 84 remain on the corrected stereoscopic images 80A, 82A.

Figure 15:
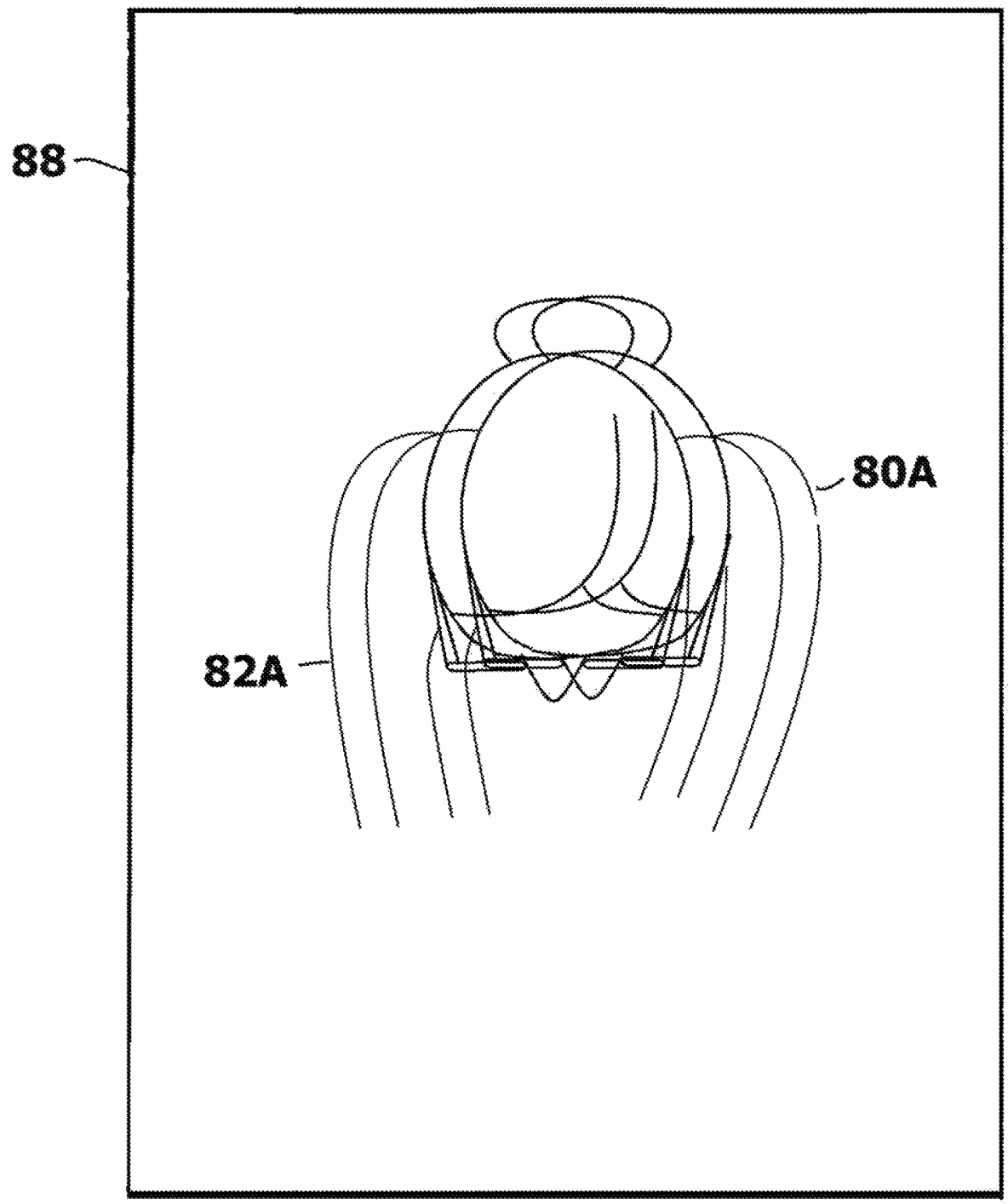
FIG. 15 shows a final image with left and right stereoscopic images superimposed.

Referring to FIG. 15, in conjunction with FIG. 14, the corrected left and right stereoscopic images 80A, 82A are superimposed. The inner guidelines 84 from both corrected stereoscopic images 80A, 82A are aligned. Once alignment is achieved, the inner guidelines 84 are removed. This creates a final image 88. If the final image 88 is to be viewed with 3D glasses, the corrected stereoscopic images 80A, 82A can be colored in red or blue, or the corrected images can be oppositely polarized. If the final image is to be viewed on an auto-stereoscopic display, the final image 88 is changed into a side-by-side format or an interlaced format.

Figure 16:
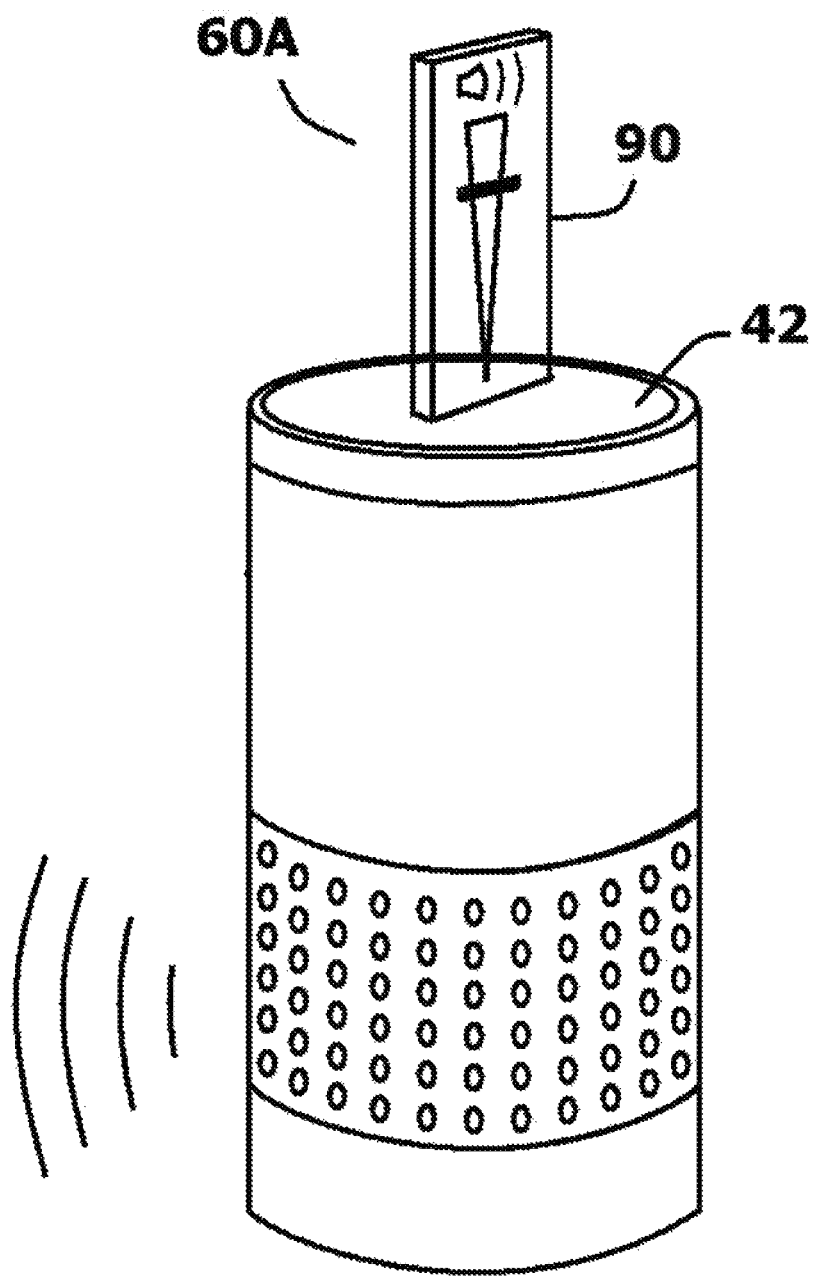
FIG. 16 shows the intelligent virtual assistant system displaying a first exemplary command response image.

As previously stated, the secondary command response image is provided with enhanced 3D effects in the same manner as was described for the interface image 41. Referring to FIG. 16 in conjunction with FIG. 4 and FIG. 5, an exemplary secondary command response image 60A for a system command is shown. As previously stated, the secondary command response image 60A is provided with enhanced vertical projection effects in the same manner as was described for the interface image 41. For this example, the system command may be "increase volume", as previously stated. For this actionable command, a 3D image of a virtual volume scale 90 appears either with the interface image 41 or in place of the interface image 41. Such scales are often used in adjusting volume on 2D displays. Accordingly, a user can quickly ascertain the current volume and changes in volume by looking at the secondary command response image 60A. The secondary exemplary command response image 60A may appear stationary, or can be made to move, such as with a slow rotation.

Figure 17:
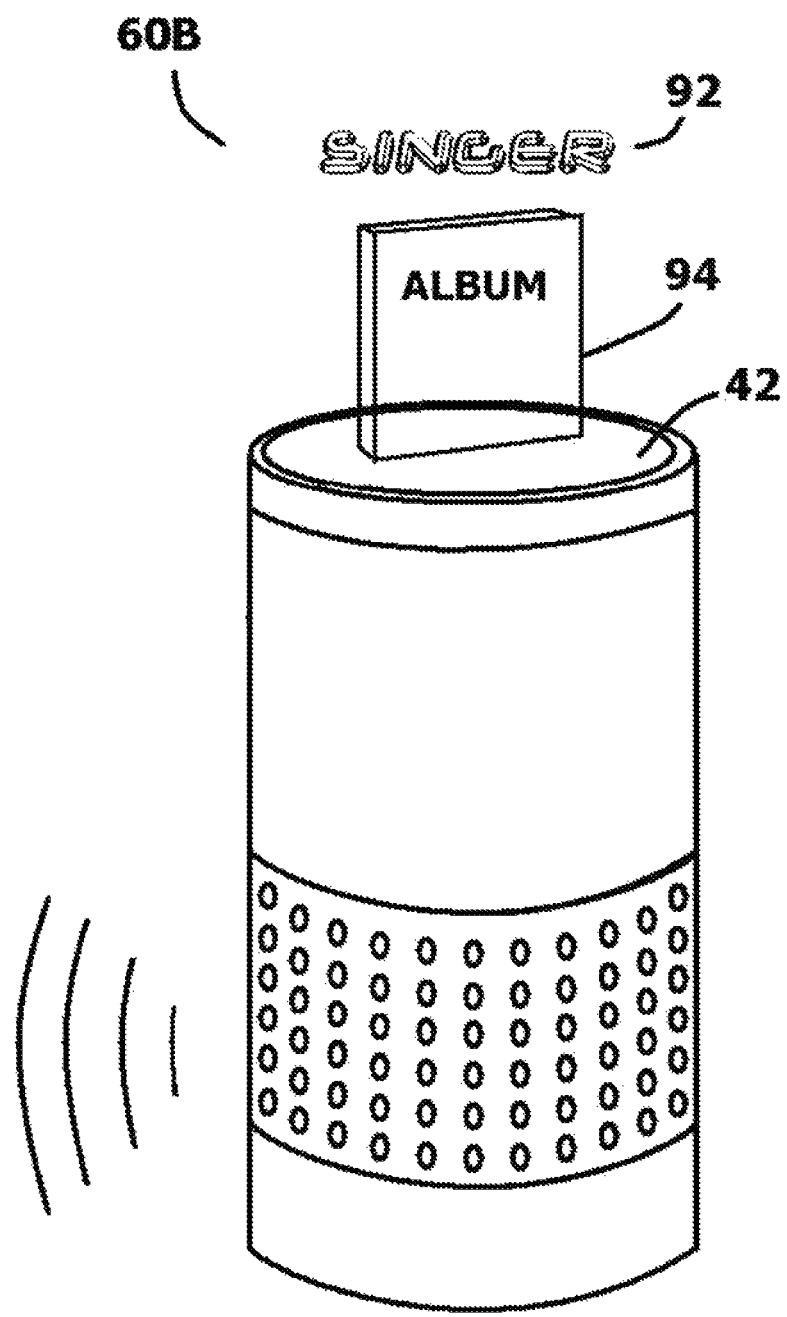
FIG. 17 shows the intelligent virtual assistant system displaying a second exemplary command response image.

Referring to FIG. 17, an example is provided for the secondary command response image 60B for a media command. If the media command were "play playlist" as previously speculated, then the secondary command response image 60B may be the name of a song 92 on that playlist accompanied by an image 94 of the album cover from the album that contains that song or the artist performing the song. If the song has a corresponding music video, the secondary command response image 60B can be the music video, altered to appear 3D and enhanced to extend above or in front of the electronic display 42.

Figure 18:
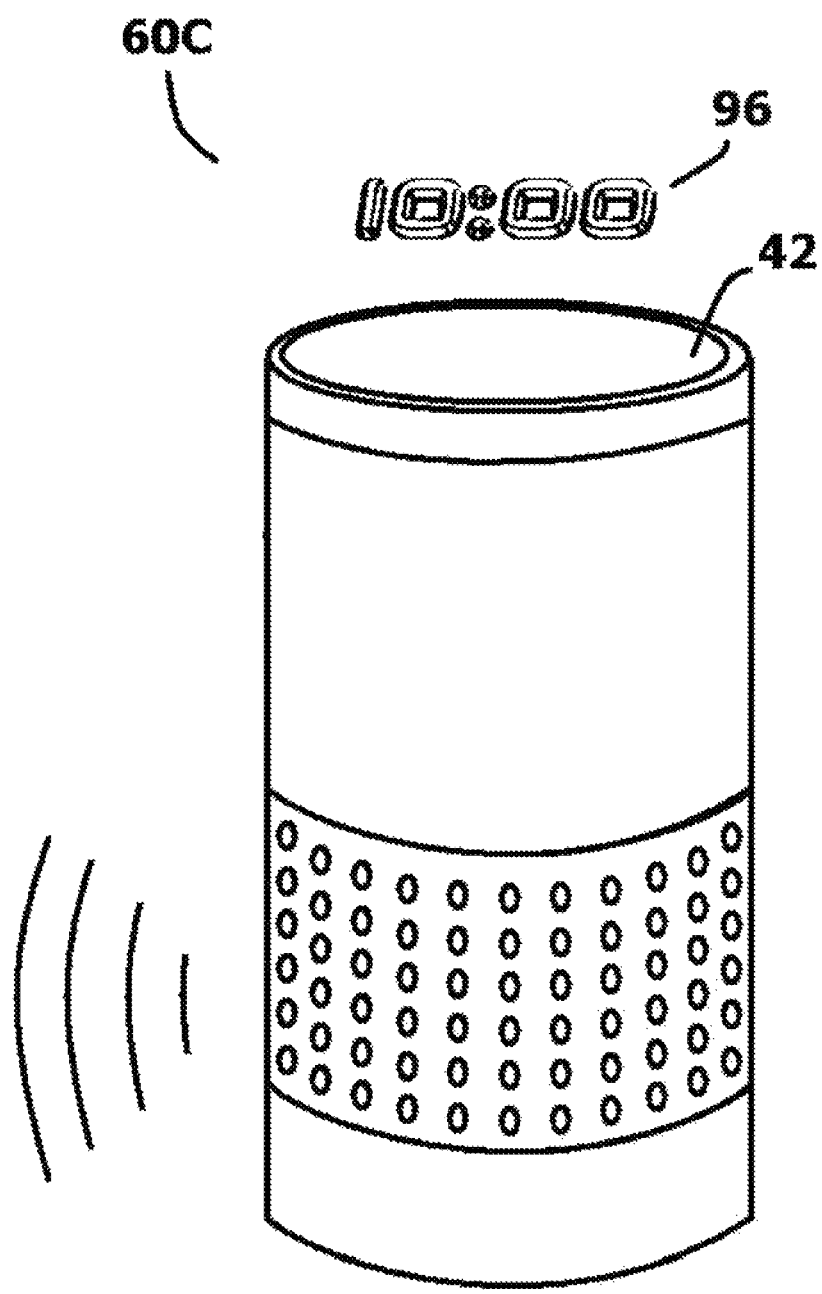
FIG. 18 shows the intelligent virtual assistant system displaying a third exemplary command response image.

Referring to FIG. 18, an example is provided for the secondary command response image 60C for a time command. If the time command were "what time is it?" as previously speculated, then the secondary command response image 60C would show an image 96 of the current time. All images would have enhanced vertical projection effects that cause the secondary command response image 60C to appear 3D and extend vertically above or in front of the electronic display 42.

Figure 19:
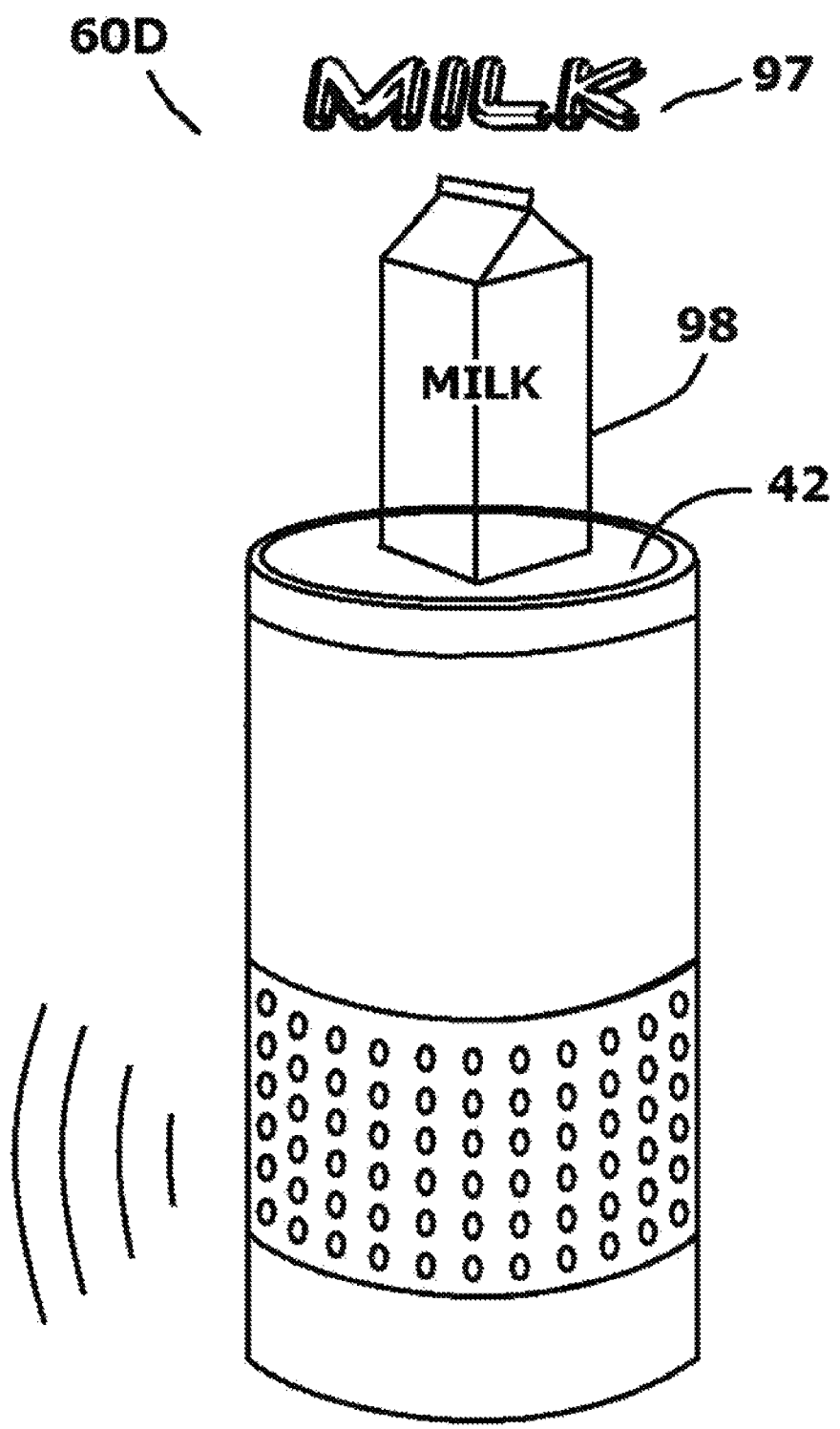
FIG. 19 shows the intelligent virtual assistant system displaying a fourth exemplary command response image.

Referring to FIG. 19, an example is provided for the secondary command response image 60D for a list command. If the list command were "add milk to the shopping list" as previously speculated, then the secondary command response image 60D would show the word milk 97 and an image of a milk carton 98 would be displayed. All images have enhanced vertical projection effects that cause the secondary command response image 97 to appear 3D and extend vertically above or in front of the electronic display 42.

Figure 20:
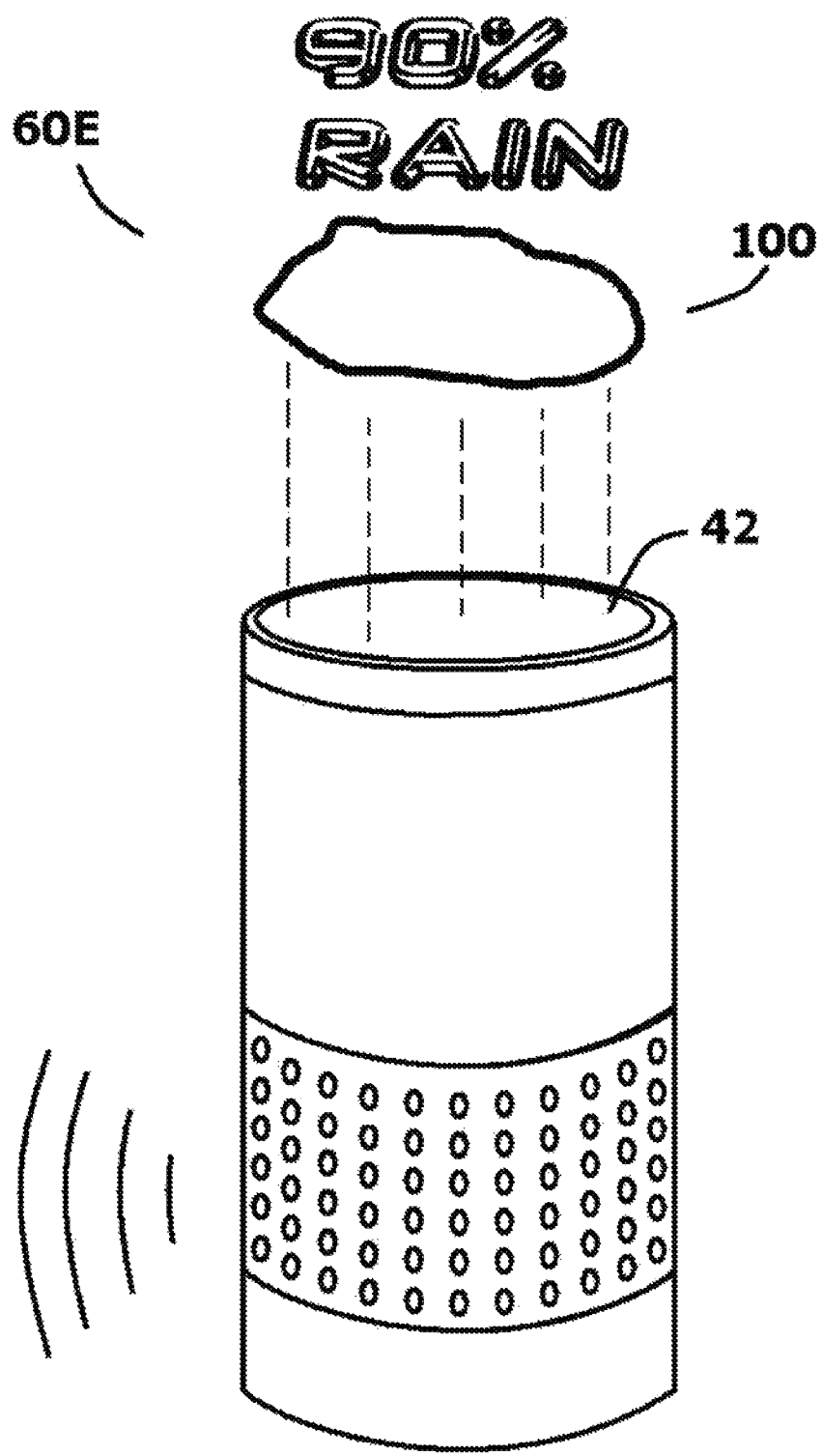
FIG. 20 shows the intelligent virtual assistant system displaying a fifth exemplary command response image.

Referring to FIG. 20, an example is provided for the secondary command response image 60E for an information command. If the information command were "what is today's weather" as previously speculated, then the secondary command response image 60E would show an image 100 of a forecast graphic. The secondary command response image 60E would have enhanced vertical projection effects that cause the secondary command response image 60E to appear 3D and extend vertically above or in front of the electronic display 42.

Figure 21:
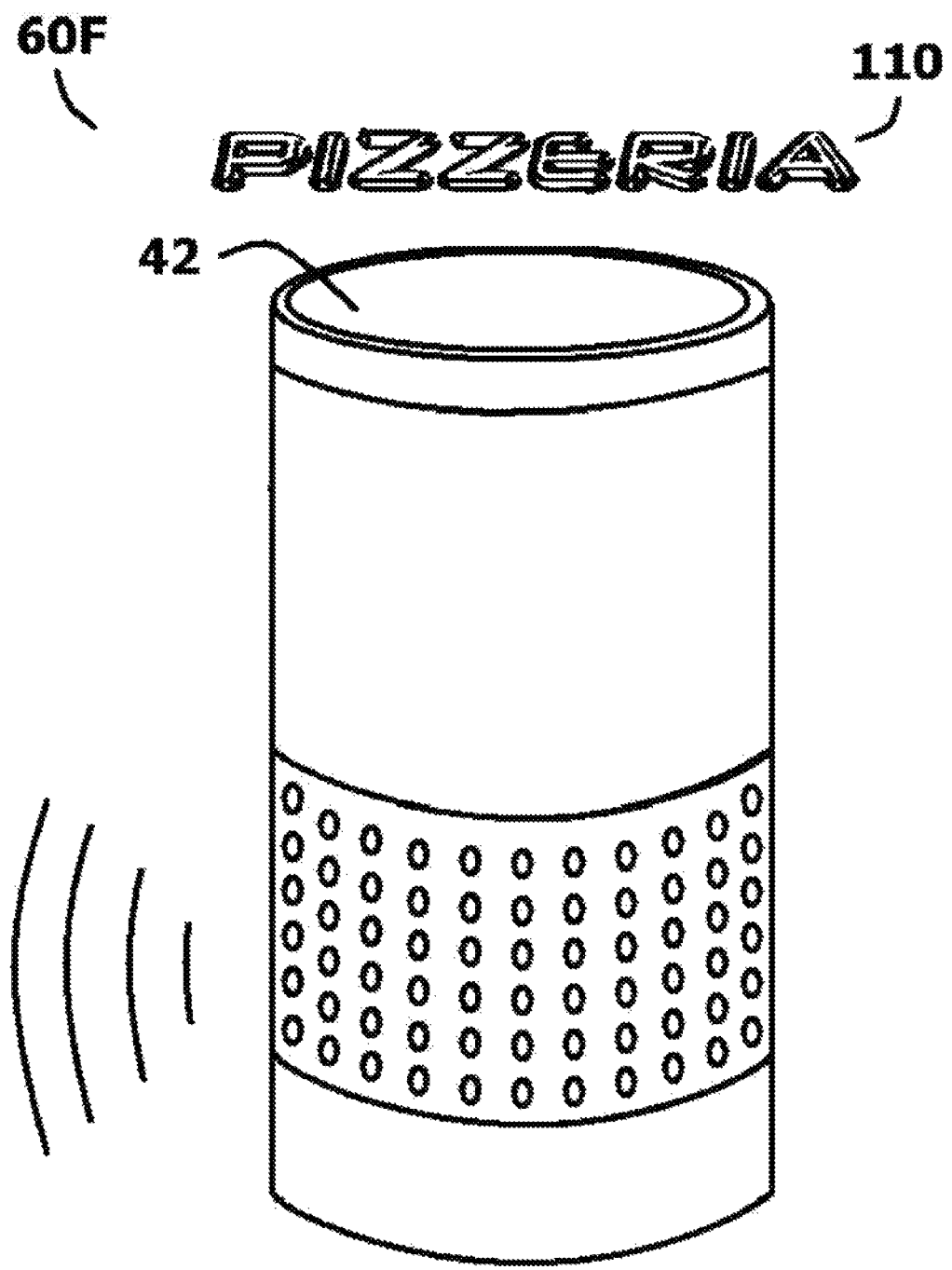
FIG. 21 shows the intelligent virtual assistant system displaying a sixth exemplary command response image.

Referring to FIG. 21, an example is provided for the secondary command response image 60F for a grammar command. If the entertainment command were "how do you spell pizzeria" as previously speculated, then the secondary command response image 60F may be an image 110 of the word pizzeria. The secondary command response image 60F would have enhanced vertical projection effects that cause the secondary command response image 120 to appear 3D and extend vertically above or in front of the electronic display 42.

Figure 22:
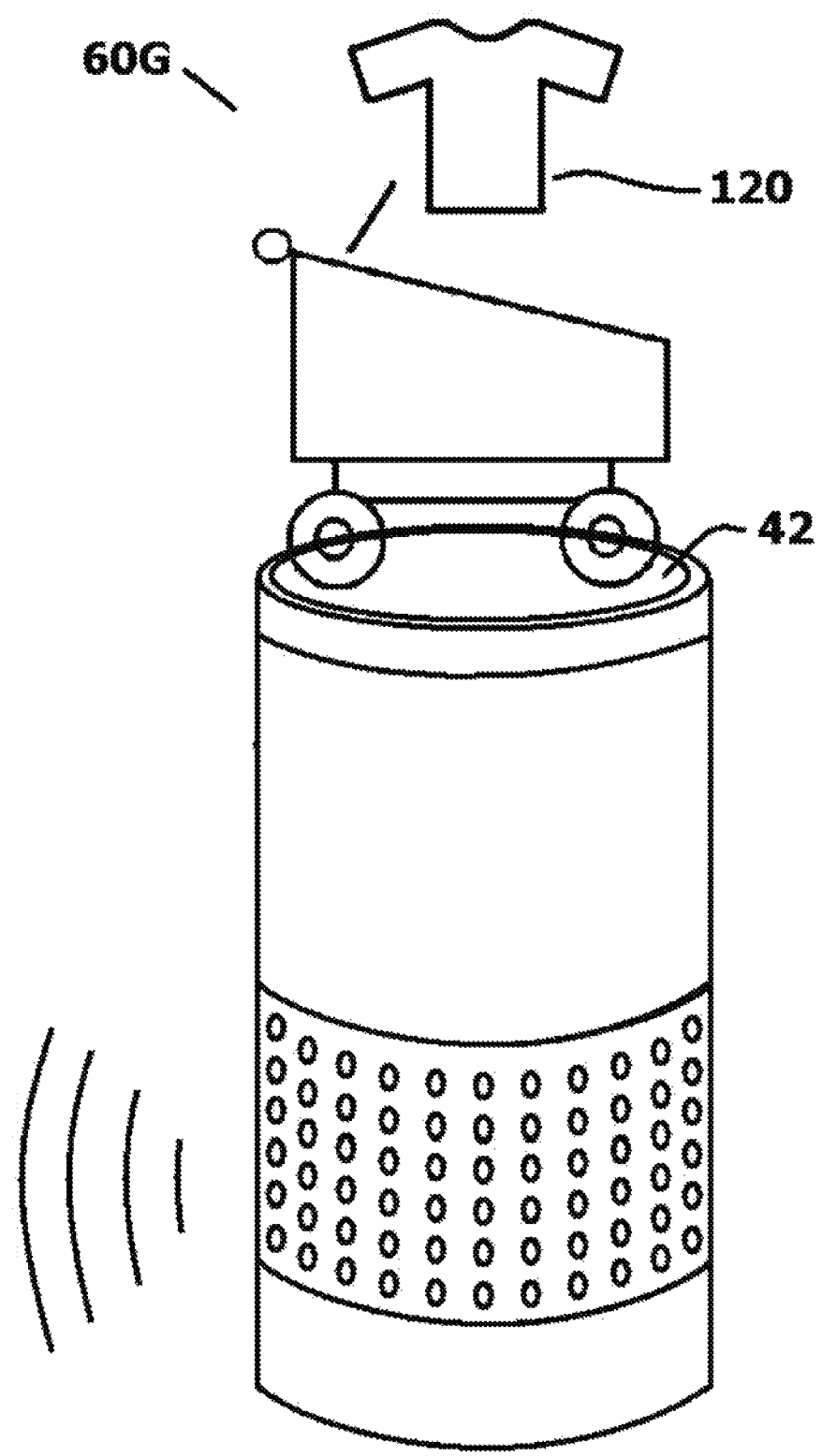
FIG. 22 shows the intelligent virtual assistant system displaying a seventh exemplary command response image.

Referring to FIG. 22, an example is provided for the secondary command response image 60G for a shop and purchase command. If the shop or purchase command 60G were "shop" and/or "place order" as previously speculated, then the secondary command response image 60G may be images 120 of the items being reviewed during shopping or items being purchased. The secondary command response image 60G would have enhanced vertical projection effects that cause the secondary command response image 60G to appear 3D and extend vertically above or in front of the electronic display 42.

Figure 23:
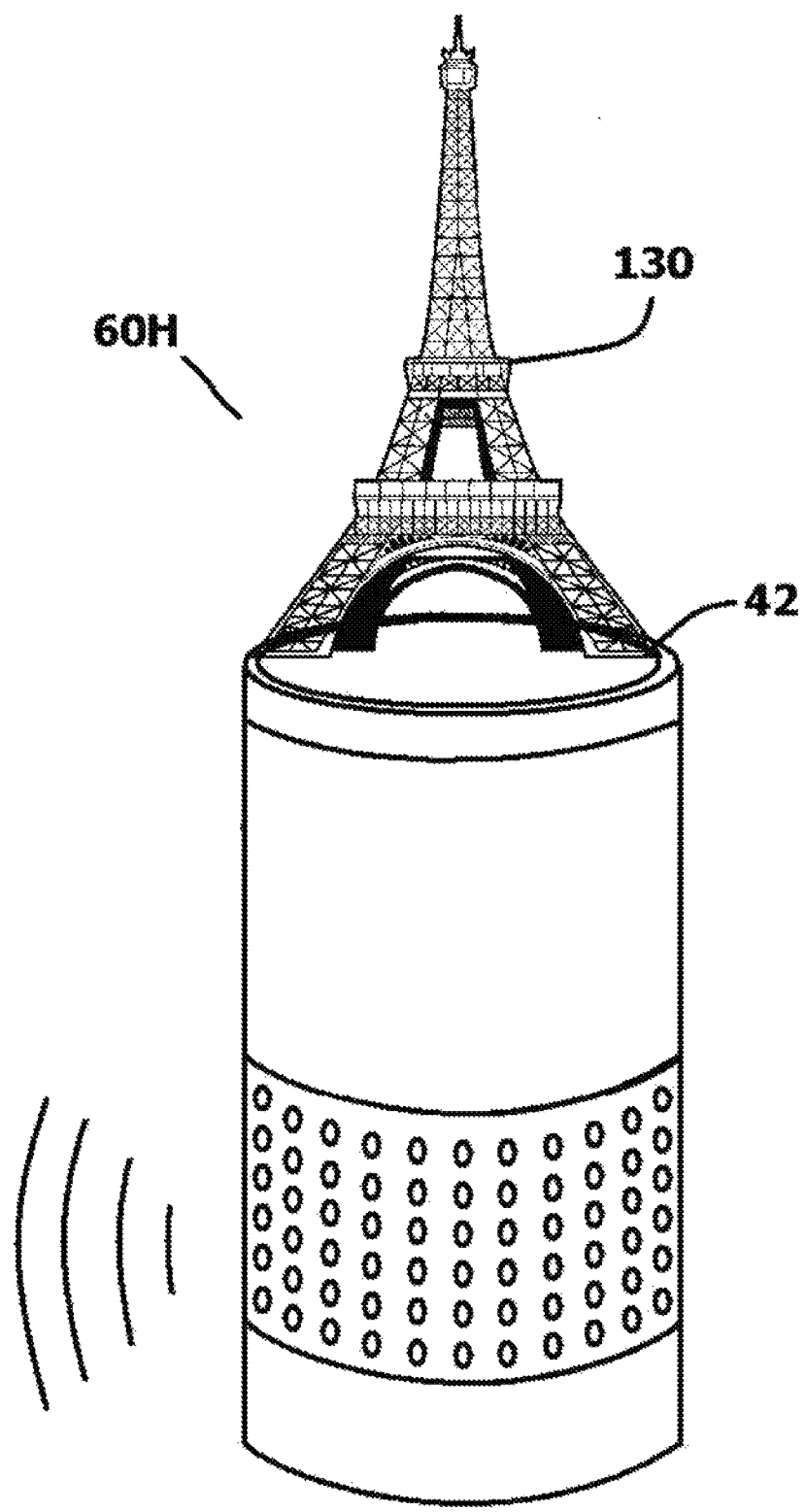
FIG. 23 shows the intelligent virtual assistant system displaying an eighth exemplary command response image.

Referring to FIG. 23, an example is provided for the secondary command response image 60H for a query command. If the query command were "what is the Eifel Tower?" as previously speculated, then the secondary command response image 60H may be an image 130 of the Eifel tower. The secondary command response image 60H would have enhanced vertical projection effects that cause the secondary command response image 60H to appear 3D and extend vertically above or in front of the electronic display 42. In all of the examples of the secondary command response images shown 60 in previous figures, it is desired that secondary command response image 60 be a three-dimensional image with enhanced vertical projection effects that cause the secondary command response image 60 to appear to extend vertically above or in front of an electronic display 42, depending upon the orientation of the electronic display 42.

Referring back to FIG. 5 in conjunction with FIG. 4 and FIG. 6, the methodology utilized by the IVA system 40 can now be explained in full. Once activated, the IVA system 40 presents an interface image 41. See Block 52 and Block 54. The interface image 41 has enhanced vertical projection effects that cause it to appear to project vertically above, or in front of, an electronic display 50. Using voice recognition software 47, the IVA system 40 listens for and identifies an action command. See Block 56 and Block 58. In performing the action command, the IVA system 40 retrieves a secondary command response image 60. See Block 62. The secondary command response image 60 must be three-dimensional and have enhanced vertical projection effects in order to project vertically above or in front of the electronic display 42 like the interface image 41. Some secondary command response images 60 and/or videos, are maintained in a 3D model database 55. If these images and/or videos are needed as the secondary command response image 60, then they are simply recalled from the 3D model database 55.

If a secondary command response image 60 is needed that is not within the 3D model database 55, then that secondary command response image is obtained through the data network 64. If an enhanced three-dimensional image or video can be found on-line, then that image or video is used directly. See Block 65. If the only subject appropriate image is a 2D image or a 2D video, then the 2D image/video is converted in a two-step process. In a first step, the 2D image/video is converted into a three-dimensional image or video using known methodologies. See Block 67. Once converted to be three-dimensional, enhanced vertical projection effects are added to the image and/or video in a second step. See Block 68. The enhanced three-dimensional image and/or video is then displayed, wherein the enhanced three-dimensional image and/or video appears to project vertically above, or in front of the electronic display. See Block 73.

Figure 24:
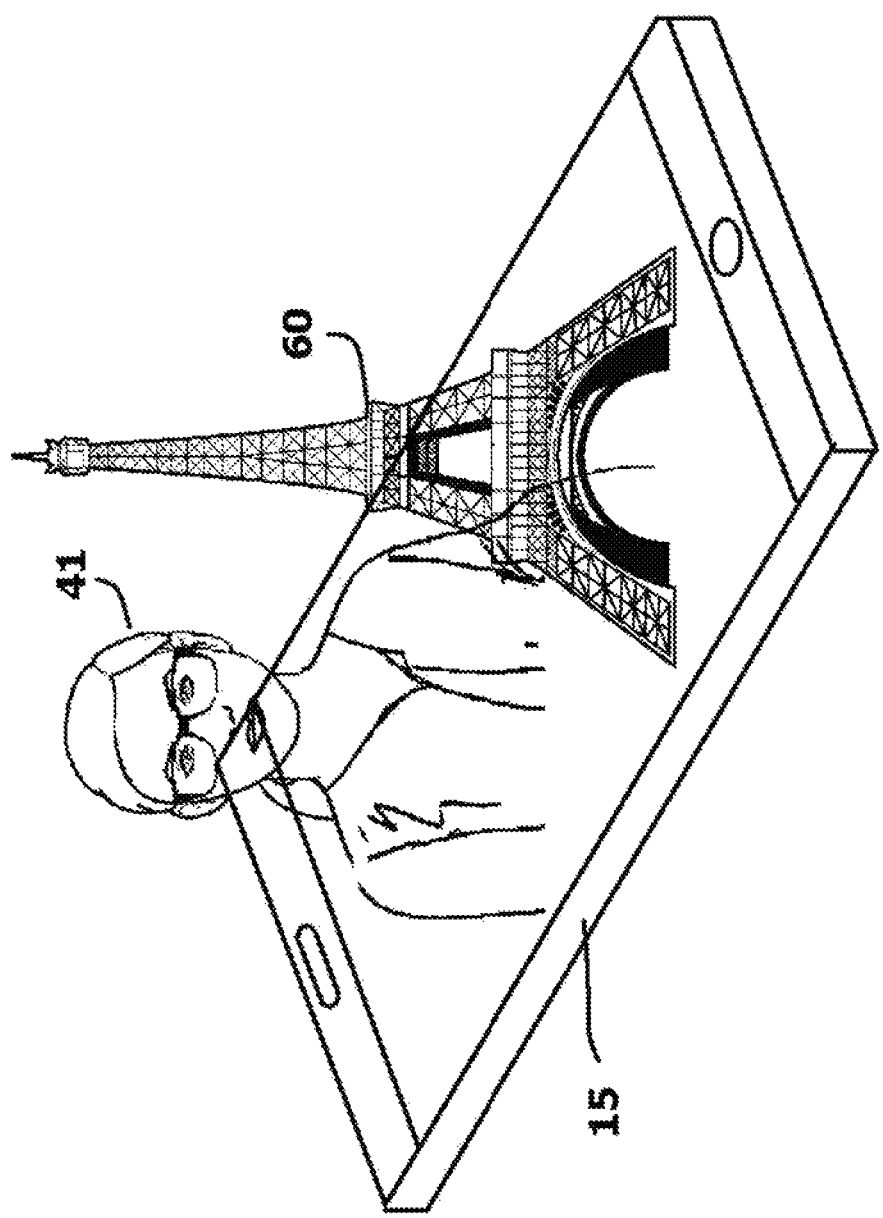
FIG. 24 shows the intelligent virtual assistant system embodied in a mobile device and displaying both an interface image and an exemplary command response image.

In the illustrations, the IVA system 10 is primarily shown running on an Amazon® Echo® base station 14. Also, the interface image 41 and secondary command response image 60 need are shown as being displayed separately. This need not be the case. The present invention IVA system can run on any electronic device that runs intelligent virtual assistant software. Also, multiple images, such as both the interface image 41 and the secondary command response image 60 can be displayed at the same time. Referring to FIG. 24, this is shown. In FIG. 24 the electronic device is shown as a smartphone 15. The smartphone 15 is displaying both an interface image 41 and a secondary command response image 60 of the Eifel tower.

Figure 25:
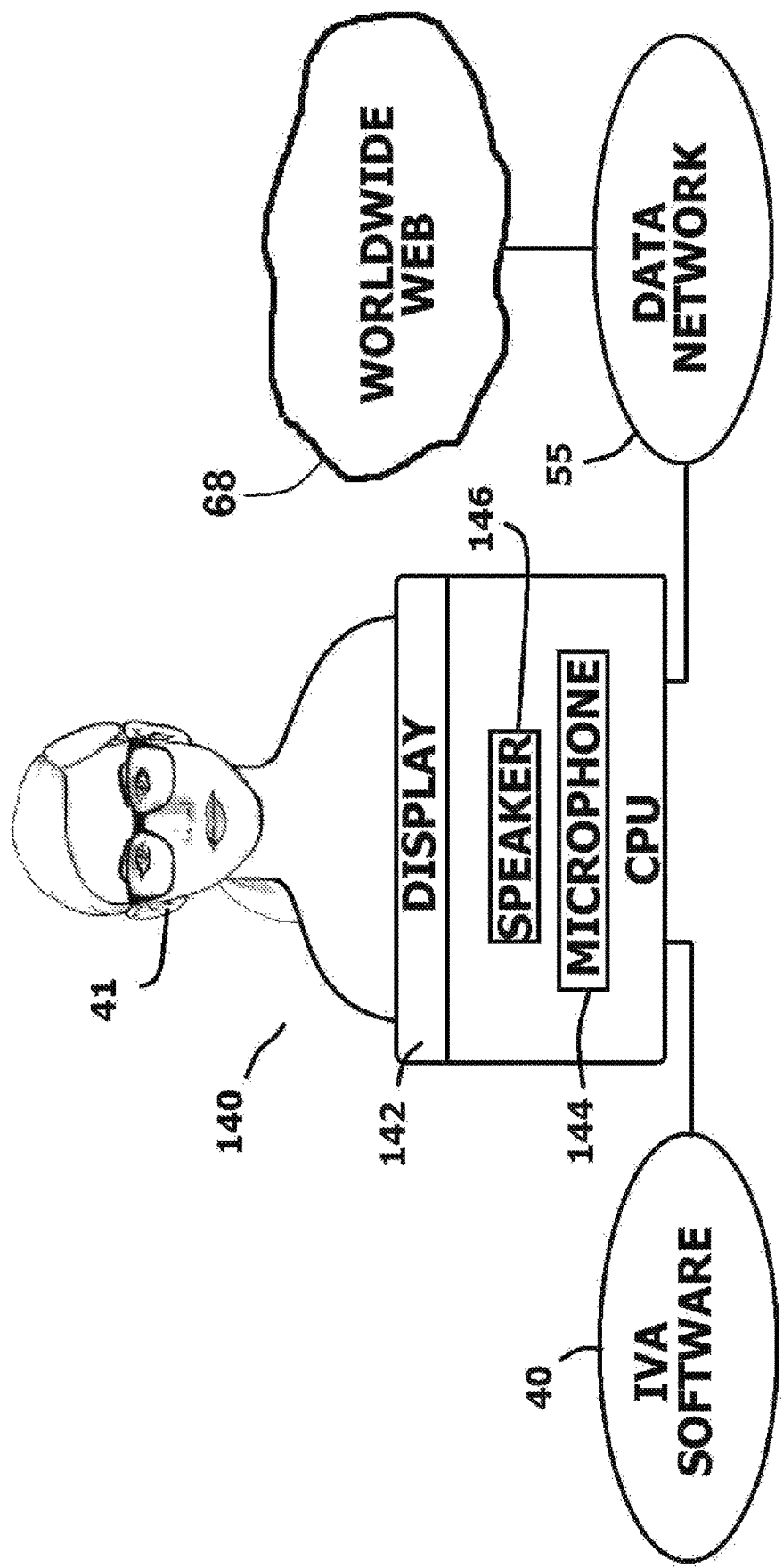
FIG. 25 shows the intelligent virtual assistant system embodied in a stationary reception kiosk.

In the previous embodiments, the intelligent virtual assistant is played through a small electronic device, such as a smartphone and an Amazon® Echo®. However, this need not be the case. Referring to FIG. 25 in conjunction with FIG. 3, an example is provided where a user can utilize a stationary system. In FIG. 25, an exemplary reception station 140 is shown. The reception station 140 may be the concierge desk at a hotel, an information desk in an office lobby, a kiosk in an amusement park or any such reception station where people would normally ask questions. The reception station 140 is unmanned and contains a display 142, a microphone 144 and a speaker 146. The display 142 here is preferably an auto-stereoscopic display that utilizes parallax barrier, lenticular, light field technology or any other auto-stereoscopic display based on any technology capable of showing three-dimensional images without the need for specialized glasses.

The reception station 140 is connected to a data network 55 and contains the integrated IVA system 40. A user approaches the reception station 140 and speaks. Once activated, the integrated IVA system 40 displays an interface image 41 that interacts with the user. The user can query the interface image 41, wherein integrated IVA system 40 uses voice recognition to identify an action command. Once the action command is identified, the action command is executed. If the action command requires no more than a verbal answer, then the interface image 41 may merely states that verbal answer. If the action command is better responded to using a secondary command response image 60, then the virtual image of the interface image 41 is with replaced with or augmented with a secondary command response image 60. As such, the user is provided with both useful audible and visual information.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A virtual assistant system, comprising:
an electronic display having a screen surface and an area in front said screen surface outside and above of said electronic display;
a processing unit linked to said electronic display that selectively produces an interface image and command response images on said electronic display, wherein said interface image is a 3D image produced from stereoscopic viewpoints that have a common parallax point, wherein said interface image and said command response images are digitally enhanced by defining a virtual reference plane and digitally tilting said reference plane about said common parallax point to cause said interface image and said command response image to appear three dimensional and to appear, at least in part, to project into said area outside of said electronic display; and
wherein said processing unit runs voice recognition software capable of detecting spoken commands, wherein said processing unit at least partially replaces said interface image with at least one of said command response images in response to said spoken commands.

2. The virtual assistant system according to claim 1, wherein said processing unit communicates with a data network.

3. The virtual assistant system according to claim 1, wherein different subroutines are assigned to said spoken commands and said different subroutines recall said command response images, wherein said processing unit runs at least one of said subroutines and recalls one of said command response images when one of said subroutines are detected by said voice recognition software.

4. The virtual assistant system according to claim 3, wherein said command response images are retrieved by said processing unit through said data network.

5. The virtual assistant system according to claim 3, further including a 3D model database accessible by said processing unit, wherein said command response images are retrieved from said 3D model database.

6. The virtual assistant system according to claim 1, wherein said interface image that has peripheral boundaries.

7. The virtual assistant system according to claim 6, wherein said interface image is digitally enhanced by tilting said interface image relative said reference plane.

8. The virtual assistant system according to claim 6, wherein said interface image is digitally enhanced by selecting a first bend point at a first elevation above said reference plane and digitally bending said interface image above said first bend point.

9. The virtual assistant system according to claim 8, wherein said interface image has a perceived height above said reference plane and said first elevation of said first bend point is between ⅓ and ⅔ of said perceived height.

10. The virtual assistant system according to claim 6, wherein said interface image is digitally enhanced by tapering at least part of said interface image above said reference plane.

11. The virtual assistant system according to claim 6, wherein said interface image is digitally enhanced by elongating at least part of said interface image above said reference plane in a direction away from said reference plane.

12. The virtual assistant system according to claim 6, wherein said command response images are digitally enhanced by tilting said command response images relative said reference plane.

13. The virtual assistant system according to claim 12, wherein said interface image is a 3D image produced from stereoscopic viewpoints, wherein said stereoscopic viewpoints have a common parallax point, wherein said command response images are digitally enhanced by digitally tilting said reference plane about said common parallax point.

14. The virtual assistant system according to claim 12, wherein said command response images are digitally enhanced by selecting a first bend point at a first elevation above said reference plane and digitally bending said command response images above said first bend point.

15. The virtual assistant system according to claim 14, wherein said command response images have a perceived height above said reference plane and said first elevation of said first bend point is between ⅓ and ⅔ of said perceived height.

16. The virtual assistant system according to claim 12, wherein said command response images are digitally enhanced by tapering at least part of said command response images above said reference plane.

17. The virtual assistant system according to claim 12, wherein said command response images are digitally enhanced by elongating at least part of said command response images above said reference plane in a direction away from said reference plane.

18. A virtual assistant system, comprising:
- an electronic display having a screen surface and an area in front said screen surface outside and above of said electronic display;
- a processing unit linked to said electronic display that selectively produces an interface image and command response images on said electronic display, wherein said interface image and said command response images are digitally enhanced by defining a virtual reference plane, selecting a first bend point at a first elevation above said reference plane, and digitally bending said command response images above said first bend point to cause said interface image and said command response image to appear three dimensional and to appear, at least in part, to project into said area outside of said electronic display; and
- wherein said processing unit runs voice recognition software capable of detecting spoken commands, wherein said processing unit at least partially replaces said interface image with at least one of said command response images in response to said spoken commands.

* * * * *